US012699396B2

(12) United States Patent
      Kirshon

(10) Patent No.: US 12,699,396 B2
(45) Date of Patent: Aug. 4, 2026

(54) MINIMAL RISK MANEUVERING IN REMOTELY OPERATED VEHICLES

(71) Applicant: Ottopia Technologies Ltd., Tel Aviv (IL)

(72) Inventor: Alexander Kirshon, Netanya (IL)

(73) Assignee: Ottopia Technologies Ltd., Tel Aviv (IL)

( * ) Notice: Subject to any disclaimer, the term of this patent is extended or adjusted under 35 U.S.C. 154(b) by 210 days.

(21) Appl. No.: 18/640,155

(22) Filed: Apr. 19, 2024

(65) Prior Publication Data

US 2025/0328135 A1 Oct. 23, 2025

(51) Int. Cl.
| | |
|---|---|
| *G05D 1/226* | (2024.01) |
| *G05D 107/13* | (2024.01) |
| *G05D 109/10* | (2024.01) |

(52) U.S. Cl.
CPC ......... *G05D 1/226* (2024.01); *G05D 2107/13* (2024.01); *G05D 2109/10* (2024.01)

(58) Field of Classification Search
CPC ............. B60W 2556/50; B60W 30/16; B60W 2050/0062; B60W 2510/244; B60W 2520/10; B60W 2520/105; B60W 2540/30; B60W 2554/4046; B60W 2554/406; B60W 2555/60; B60W 30/18163; B60W 50/00; B60W 60/0015; H04W 4/40; H04W 74/002; H04W 80/02; H04W 40/04; G01C 21/3438; G01C 21/343; G01C 21/34; G01C 21/3446; G01C 21/3841; G06N 20/00; G06N 5/01; G06Q 10/047; G06Q 10/04; G06Q 30/0202; G06Q 30/0206; G06Q 30/06;

G06Q 40/04; G08G 1/096827; G08G 1/096838; G08G 1/096844; G08G 1/123; G09B 29/10; G06V 20/58; G06V 2201/08; Y02D 30/70; G05D 1/226; G05D 2107/13; G05D 2109/10
See application file for complete search history.

(56) References Cited

U.S. PATENT DOCUMENTS

| | | | |
|---|---|---|---|
| 8,280,623 | B2 | 10/2012 | Trepagnier et al. |
| 8,660,734 | B2 | 2/2014 | Zhu et al. |
| 9,776,638 | B1 | 10/2017 | Green |

(Continued)

FOREIGN PATENT DOCUMENTS

CN 118250767 A * 6/2024 ............ H04W 40/04

OTHER PUBLICATIONS

DE102017218395A, Apr. 2018, Kummel Martin, B60W 50/029.*

*Primary Examiner* — Nga X Nguyen
(74) *Attorney, Agent, or Firm* — M&B IP Analysts, LLC

(57) ABSTRACT

A system and method for initiating safety maneuvers. A method includes creating an interactions chain data structure for an interactions chain, wherein the interactions chain includes a plurality of chain links arranged in an order, the plurality of chain links representing a plurality of components used for communications between a vehicle and at least one operation system, wherein the interactions chain data structure includes a plurality of nodes representing the plurality of chain links and a plurality of edges connecting between nodes of the plurality of nodes; determining a plurality of statuses of the plurality of chain links; and initiating a safety maneuver for the vehicle based on the determined plurality of statuses.

19 Claims, 13 Drawing Sheets

(56)　　　　　References Cited

U.S. PATENT DOCUMENTS

| | | | |
|---|---|---|---|
| 11,669,108 | B2 | 6/2023 | Laws et al. |
| 2018/0169858 | A1* | 6/2018 | Jain ..................... B65G 1/1375 |
| 2019/0232955 | A1 | 8/2019 | Grimm et al. |
| 2021/0186329 | A1 | 6/2021 | Tran |
| 2023/0298466 | A1* | 9/2023 | Nordbruch ....... G08G 1/096725 |
| | | | 701/24 |
| 2023/0324187 | A1* | 10/2023 | Wang ................... G06Q 10/047 |
| | | | 701/410 |

* cited by examiner

100A

Database
150

Remote
Operation
System
140

Network

110

120

Maneuver
Manager
130

MINIMAL RISK MANEUVERING IN REMOTELY OPERATED VEHICLES

TECHNICAL FIELD

The present disclosure relates generally to remote vehicle operations, and more specifically to performing minimal risk maneuvers for vehicles which may be operated at least partially based on remote commands.

BACKGROUND

Many modern vehicles possess capabilities which allow for at least some degree of remote operation. Such capabilities may allow a remote operator to make certain decisions in the place of a driver located in the vehicle or onboard driving system.

These remote capabilities may be realized via connected vehicles. A connected vehicle is a vehicle including or otherwise being configured with equipment, applications, systems, and the like, which enable communications between the vehicle and other systems in order to receive instructions, commands, or other data. These communications may be utilized to provide support for the vehicle with respect to safety, efficiency, and mobility.

While remote operating systems may allow for more skilled drivers or for human override of assisted driving vehicle operations in cases where the local operator or autonomous driving system is incapable of safely navigating, remote operating systems are prone to challenges in navigating safely due to delays between capturing data onboard the vehicle and receipt of that data at a remote operating system. In other words, if appropriate decisions are not made promptly, remote operation may fail to improve safety.

Techniques for improving safety of remote operation of connected vehicles, and more specifically for improving safety of remotely operated vehicles in situations where full visibility or control may be unavailable to a remote operator, would therefore be desirable.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments, and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Certain embodiments disclosed herein include a method for initiating safety maneuvers. The method comprises: creating an interactions chain data structure for an interactions chain, wherein the interactions chain includes a plurality of chain links arranged in an order, the plurality of chain links representing a plurality of components used for communications between a vehicle and at least one operation system, wherein the interactions chain data structure includes a plurality of nodes representing the plurality of chain links and a plurality of edges connecting between nodes of the plurality of nodes; determining a plurality of statuses of the plurality of chain links; and initiating a safety maneuver for the vehicle based on the determined plurality of statuses.

Certain embodiments disclosed herein also include a non-transitory computer readable medium having stored thereon causing a processing circuitry to execute a process, the process comprising: creating an interactions chain data structure for an interactions chain, wherein the interactions chain includes a plurality of chain links arranged in an order, the plurality of chain links representing a plurality of components used for communications between a vehicle and at least one operation system, wherein the interactions chain data structure includes a plurality of nodes representing the plurality of chain links and a plurality of edges connecting between nodes of the plurality of nodes; determining a plurality of statuses of the plurality of chain links; and initiating a safety maneuver for the vehicle based on the determined plurality of statuses.

Certain embodiments disclosed herein also include a system for initiating safety maneuvers. The system comprises: a processing circuitry; and a memory, the memory containing instructions that, when executed by the processing circuitry, configure the system to: create an interactions chain data structure for an interactions chain, wherein the interactions chain includes a plurality of chain links arranged in an order, the plurality of chain links representing a plurality of components used for communications between a vehicle and at least one operation system, wherein the interactions chain data structure includes a plurality of nodes representing the plurality of chain links and a plurality of edges connecting between nodes of the plurality of nodes; determine a plurality of statuses of the plurality of chain links; and initiate a safety maneuver for the vehicle based on the determined plurality of statuses.

Certain embodiments disclosed herein include the method, non-transitory computer readable medium, or system noted above, wherein the plurality of statuses of the plurality of chain links is determined based on a plurality of signals for the plurality of chain links.

Certain embodiments disclosed herein include the method, non-transitory computer readable medium, or system noted above, wherein the plurality of statuses includes a first status for a first chain link of the plurality of chain links, wherein the first status indicates that the first chain link is broken, wherein the first status is determined based on a gap between a most recent signal of the plurality of signals for the first chain link and a current time that is above a threshold.

Certain embodiments disclosed herein include the method, non-transitory computer readable medium, or system noted above, wherein each of the plurality of signals is a binary value.

Certain embodiments disclosed herein include the method, non-transitory computer readable medium, or system noted above, wherein the interactions chain data structure is further based on an order of the plurality of chain links, wherein the plurality of chain links includes a first chain link and a second chain link, wherein the second chain link is downstream from the first chain link within the order of the plurality of chain links, wherein a second status of the second chain link among the plurality of statuses is determined based on a first status of the first chain link among the plurality of statuses.

Certain embodiments disclosed herein include the method, non-transitory computer readable medium, or system noted above, wherein the first status of the first chain link is broken, wherein the second status of the second chain link is determined as broken when it is determined that the first status of the first chain link is broken.

Certain embodiments disclosed herein include the method, non-transitory computer readable medium, or system noted above, wherein at least one first of the plurality of statuses is determined based on a second status of the plurality of statuses.

Certain embodiments disclosed herein include the method, non-transitory computer readable medium, or system noted above, wherein the interactions chain is determined based on a type of the vehicle and at least one predetermined component associated with the type of the vehicle.

Certain embodiments disclosed herein include the method, non-transitory computer readable medium, or system noted above, wherein the interactions chain is determined based on at least one predetermined second type of component associated with at least one predetermined first type of component represented by a portion of the plurality of chain links.

Certain embodiments disclosed herein include the method, non-transitory computer readable medium, or system noted above, further including or being configured to perform the following step or steps: identifying at least one available safety maneuver for the vehicle based on the determined plurality of statuses; determining a safety maneuver based on the identified at least one available safety maneuver, wherein the initiated safety maneuver is the determined safety maneuver.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1A:
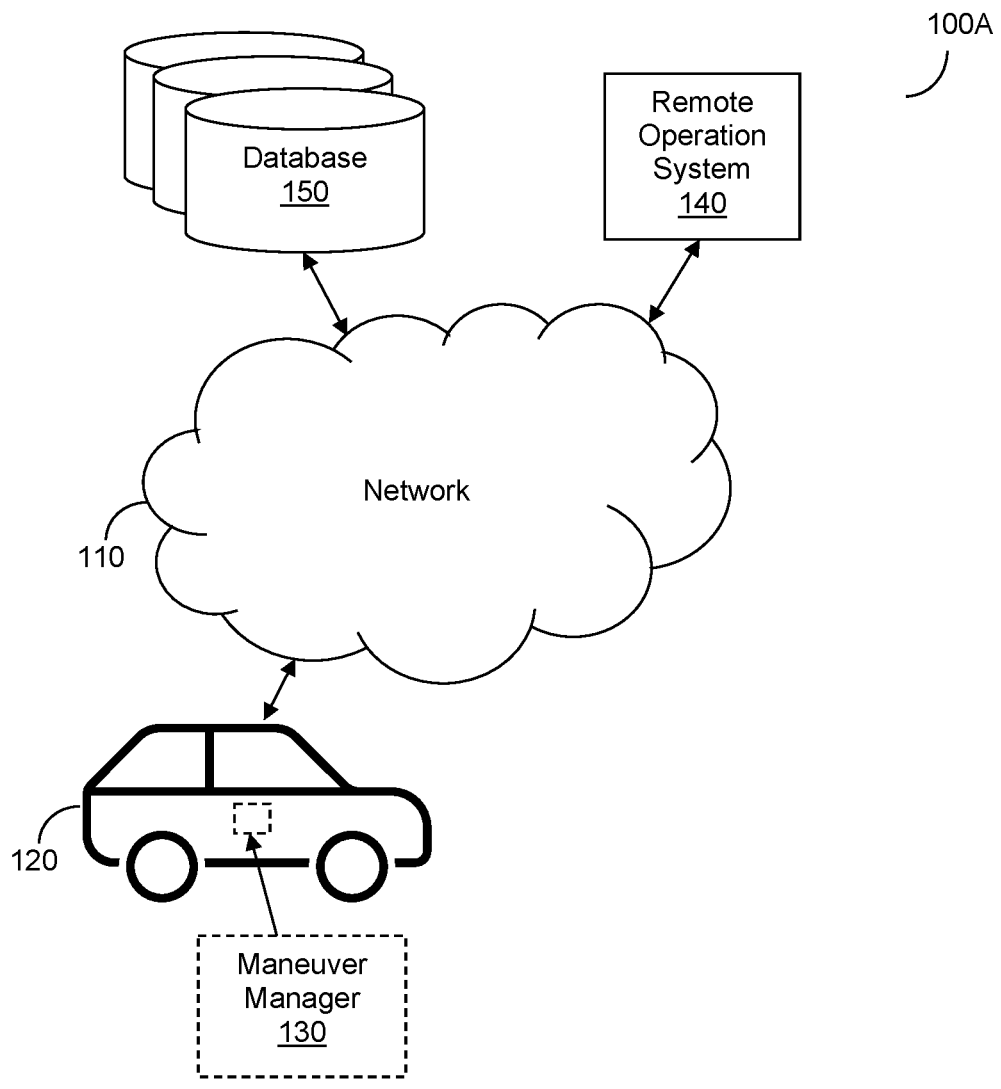
FIGS. 1A-B are network diagrams utilized to describe various disclosed embodiments.

The various disclosed embodiments include various techniques for performing and aiding in performing safety maneuvers such as minimal risk maneuvers (MRMs) during operation of a vehicle which is at least partially conducted based on commands from remote systems. The disclosed embodiments can be utilized with fully or partially autonomous vehicles, driving-assisted vehicles, or other vehicles which may receive and perform at least some actions based on remote commands. The safety maneuvers performed as discussed herein may be or may include actions to avoid harm to the vehicle, to one or more occupants of the vehicle, to bystanders in the road, to property, and the like. More specifically, the safety maneuvers may be performed in order to reduce or otherwise minimize the actions taken in order to avoid one or more dangers. In other words, the safety maneuvers may be or may include MRMs which minimize the number or degree of actions performed in order to avoid harm to the vehicle, its occupants, its surroundings, or a combination thereof.

In an embodiment, an interactions chain is established for a vehicle. In a further embodiment, the interactions chain is a logical representation of interactions between components used to enable remote operations for the vehicle which is ordered such that some chain links representing respective components appear earlier in the order than other chain links, and the chain links are connected based on dependencies between their respective components. An interactions chain data structure is generated, where the interactions chain data structure represents the interactions chain. For example, the interactions chain data structure may be realized as a graph including nodes representing respective chain links and edges connecting the nodes.

The interactions chain data structure may be used to track statuses of components, for example, by assigning values to nodes represented in the interactions chain data structure corresponding to a link status of either intact or broken. More specifically, signals for components represented by links may be monitored and utilized to determine when a chain link has been broken. The values of the interactions chain data structure may be updated as their respective chain links become broken. When a safety maneuver trigger is detected, the values in the interactions chain data structure may be checked in order to determine the statuses of their respective chain links.

In accordance with various disclosed embodiments, the connections between chain links represented by the interactions chain data structure may be utilized to determine statuses of chain links. In particular, when some chain links have a status of broken, other chain links which are downstream from those chain links in an order of the interactions chain may also be determined as broken. Accordingly, the chain of interactions may be used to identify certain components as broken for purposes of determining safety maneuvers even when the actual status of those components is unclear.

As discussed herein, this may allow for identifying available safety maneuvers and, consequently, determining safety maneuvers to be performed faster and more efficiently. That is, broken chain links may be utilized to determine which components are considered to be available to perform safety maneuvers, which in turn effectively allows for determining implicitly which safety maneuvers can be performed given a current state of the interactions chain. This implicit determination can therefore be performed without a full investigation into the exact circumstances of which components have failed, which might otherwise interfere with timely performing safety maneuvers.

In this regard, it is noted that safety-related maneuvers such as MRMs are intended to prevent harm from dangers in the road or from within the vehicle, but that these maneuvers can introduce new dangers in some circumstances. As a non-limiting example, stopping the vehicle may be a suitable maneuver to avoid driving into an obstacle, but stopping the vehicle in the middle of a highway may cause another vehicle to crash into the stopped vehicle. Sensors or other systems that provide contextual awareness of the vehicle's surrounding might help to avoid these kinds of issues, but existing solutions often rely on predetermined mappings in order to decide which safety maneuvers to perform, where to automatically navigate, where to stop, and the like. For example, a predetermined map of a highway may be used in order to select a location for a vehicle to stop. Relying on these predetermined mappings to determine how to perform safety maneuvers may result in performing save maneuvers that introduce such dangers.

It has further been identified that existing capabilities installed in vehicles tend to be certified or otherwise tested for safety. To this end, various disclosed embodiments leverage existing capabilities of vehicles to perform safety maneuvers using actions which the vehicles are preconfigured in order to maximize safety. The existing capabilities utilized in accordance with various disclosed embodiments may include, but are not limited to, sensors, output devices, assisted driving systems, autonomous driving systems, and any other detection or operation systems available to the vehicle according to an existing configuration of the vehicle.

Moreover, it has been further identified that the framework utilized to remotely control certain vehicle operations may involve several points of interaction, where failure of any of these points of interaction may interfere with safe remote operation of the vehicle. This multi-interaction framework may be particularly relevant in the context of MRMs because MRMs are typically performed in safety-critical situations which are often time-sensitive. That is, in time-sensitive situations, prioritizing safety may involve foregoing detailed investigations into which specific components failed.

Accordingly, various disclosed embodiments provide techniques for modeling chains of interactions between a vehicle and a remote operator system as well as techniques for utilizing such modeling in order to make decisions regarding remotely initiated safety maneuvers such as remotely initiated MRMs which allow for improving safety of such remotely initiated safety maneuvers. In at least some disclosed embodiments, using the framework described herein, the arrangement of the links may be utilized to identify a set of links, where any link among the set may have failed such that the safer assumption is to assume all links among the set have failed unless and until a detailed investigation has been performed. That is, if a component represented by a certain link in the interactions chain has failed, then other components may also be treated as failed for purposes of determining safety maneuvers, thereby minimizing the risk of relying on data from a component where it is uncertain whether the component has actually failed.

Figure 1B:
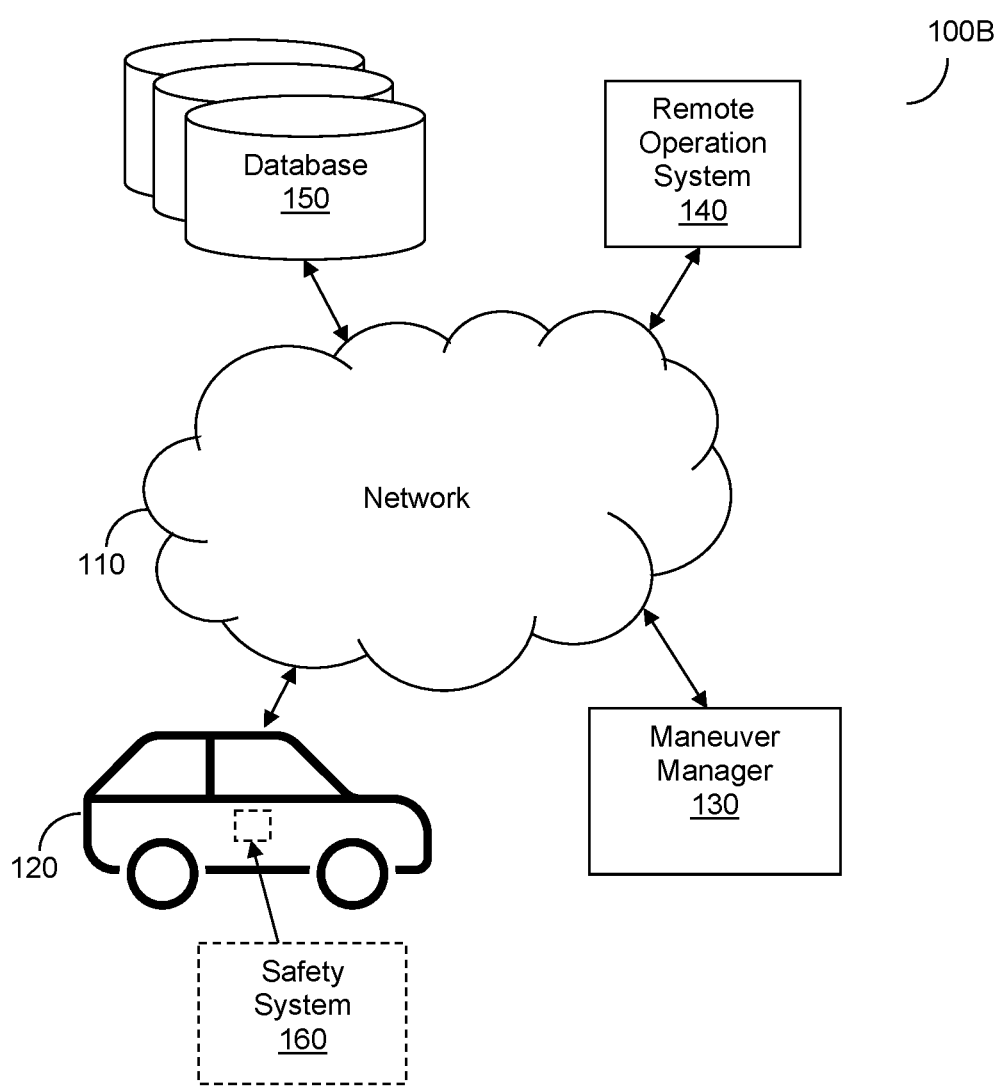

FIGS. 1A-B show example network diagrams 100A and 100B, respectively, utilized to describe the various disclosed embodiments. In the example network diagram 100A, a vehicle 120 communicates with a remote operator device 140 and a plurality of databases 150-1 through 150-N (hereinafter referred to individually as a database 150 and collectively as databases 150, merely for simplicity purposes) via a network 110. The network 110 may be, but is not limited to, a wireless, cellular or wired network, a local area network (LAN), a wide area network (WAN), a metro area network (MAN), the Internet, the worldwide web (WWW), similar networks, and any combination thereof.

The vehicle 120 may be equipped with systems, devices, software, combinations thereof, and the like (not shown), configured to allow for network communications between the vehicle 120 and one or more remote systems such as the remote operation system 140. At least some of these systems, devices, or software, may be utilized to receive commands (e.g., from the remote operation system 140) such as, but not limited to, commands to initiate remote operation activities. Such remote operation activities may include, but are not limited to, minimal risk maneuvers (MRMs).

In the non-limiting example implementation shown in FIG. 1A, the vehicle 120 has installed thereon a maneuver manager 130. The maneuver manager 130 is configured to perform at least a portion of the disclosed embodiments such as, but not limited to, modeling chains of interactions between the vehicle 120 and the remote operator system 140, initiating minimal risk maneuvers, determining statuses of systems among chains of interactions, combinations thereof, and the like.

The remote operation system 140 may be configured to send commands to the vehicle 120 (e.g., remote driving or assisted driving commands). To this end, the remote operation system 140 may include or be communicatively connected to one or more network components, input/output (I/O) devices, user devices, and the like (not shown). Such communicatively connected components and devices may be utilized to receive inputs by the remote operation system 140, to communicate via the network 110, both, and the like. The remote operation system 140 may be an automated remote driving decision-making system, may be operated by a manual operator (e.g., a human operator who provides driving inputs via one or more I/O devices), both, and the like.

In various implementations, the remote operation system 140 may be configured to periodically or otherwise repeatedly send signals to the vehicle 120. The signals may be utilized to indicate that the remote operation system 140 is currently capable of communicating with the vehicle 120 such that, when the signals are not received at periodic intervals or otherwise when the signals are expected to be received, it may be determined that a link in a chain of interactions (also referred to as an interactions chain) in the network 110, in the remote operation system 140, or with one or more other systems (not shown) connected to or communicating with the remote operation system 140, or a combination thereof, has been broken. When such a link has been broken, safety maneuvers which do not rely on any components or systems beyond the severed link in the interactions chain may be determined. That is, it may be assumed that the vehicle 120 should perform safety activities such as MRMs without input from the remote operation system 140, at least temporarily (e.g., until signals resume being received from the remote operation system 140 at the vehicle 120).

Alternatively or in addition, the signals sent by the remote operation system 140 may indicate whether one or more components which interact with the remote operation system 140 are operable in order to provide more granular information about where a link in the interactions chain has been severed. As a non-limiting example, when one of the links represents one or more I/O devices including a keyboard (not shown in FIGS. 1A-B) connected to the remote operation system 140 and the keyboard is not working properly, the remote operation system 140 may send a signal indicating that the I/O devices are not working properly or, more specifically, that the keyboard I/O device is not working properly. When the maneuver manager 130 receives such a signal from the remote operation system 140, the maneuver manager 130 may determine which safety activities to perform assuming that certain types of commands which require I/O devices generally or a keyboard specifically will not be received while the remote operation system 140 continues to send signals indicating that the I/O devices or keyboard are not working properly.

FIG. 1B illustrates another non-limiting example implementation of the network diagram 100B in which the maneuver manager 130 is deployed remotely from the vehicle 120. As illustrated in FIG. 1B, the maneuver manager 130 may communicate with the vehicle 120, the remote operation system 140, or both, over the network 110. Moreover, the vehicle 120 may have a safety system 160 installed thereon which is configured to perform safety activities such as, but not limited to, minimal risk maneuvers. For example, the maneuver manager 130 may send commands to the safety system 160 of the vehicle 120 to initiate MRMs when one or more links in an interactions chain related to communications involving the remote operation system 140 are broken. That is, when a remote operation system 140 is unable to safely control at least a portion of the vehicle activities, the maneuver manager 130 may be configured to instruct the safety system 160 to perform safety activities in order to protect the vehicle.

It should be noted that the safety system 160 is depicted as a separate component from the maneuver manager 130 and that the safety system 160 is only illustrated in FIG. 1B merely for example and discussion purposes, but that the safety system 160 may be integrated with the maneuver manager 130 or may be installed on the vehicle along with the maneuver manager 130 without departing from the scope of the disclosure. Additionally, as described herein, communications from the vehicle 120 to one or more remote systems such as the remote operation system 140 may involve multiple components, devices, and systems, which are not illustrated in FIGS. 1A-B merely for simplicity purposes and without limitation on the disclosed embodiments. The non-limiting example illustrations shown in FIGS. 1A-B should not be interpreted as necessarily limiting any of the various disclosed embodiments.

An example schematic diagram of hardware which may be utilized to realize the maneuver manager 130, the safety system 160, the remote operation system 140, or a combination thereof, is described further below with respect to FIG. 5.

Figure 2A:
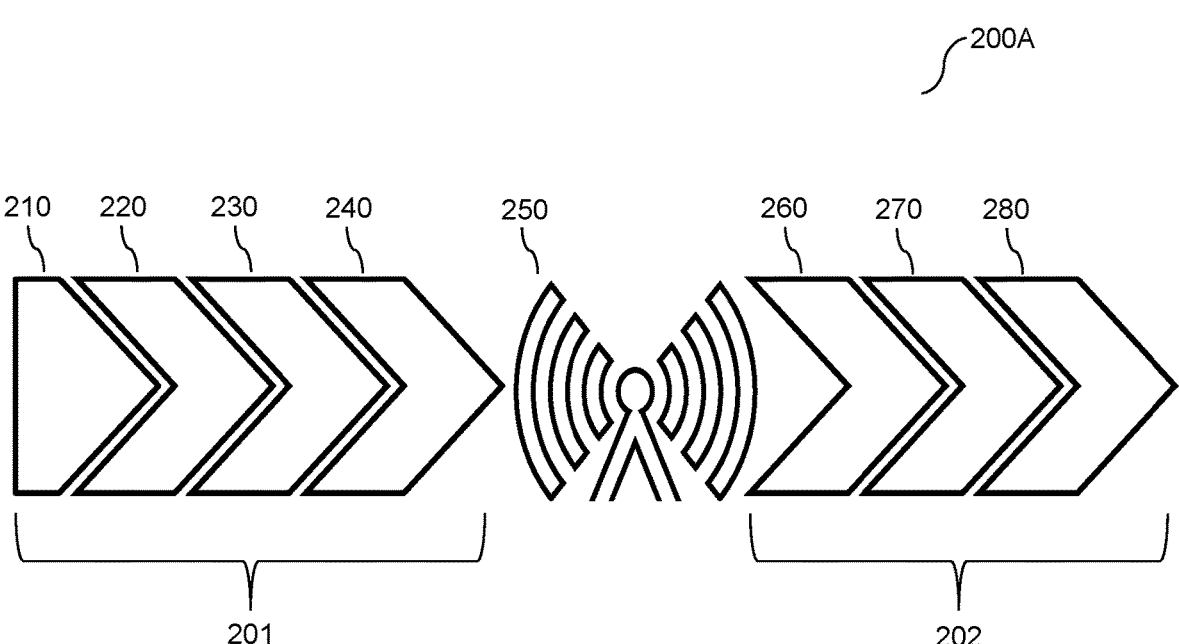
FIGS. 2A-C are illustrations of interactions chain representations.
Figure 2B:
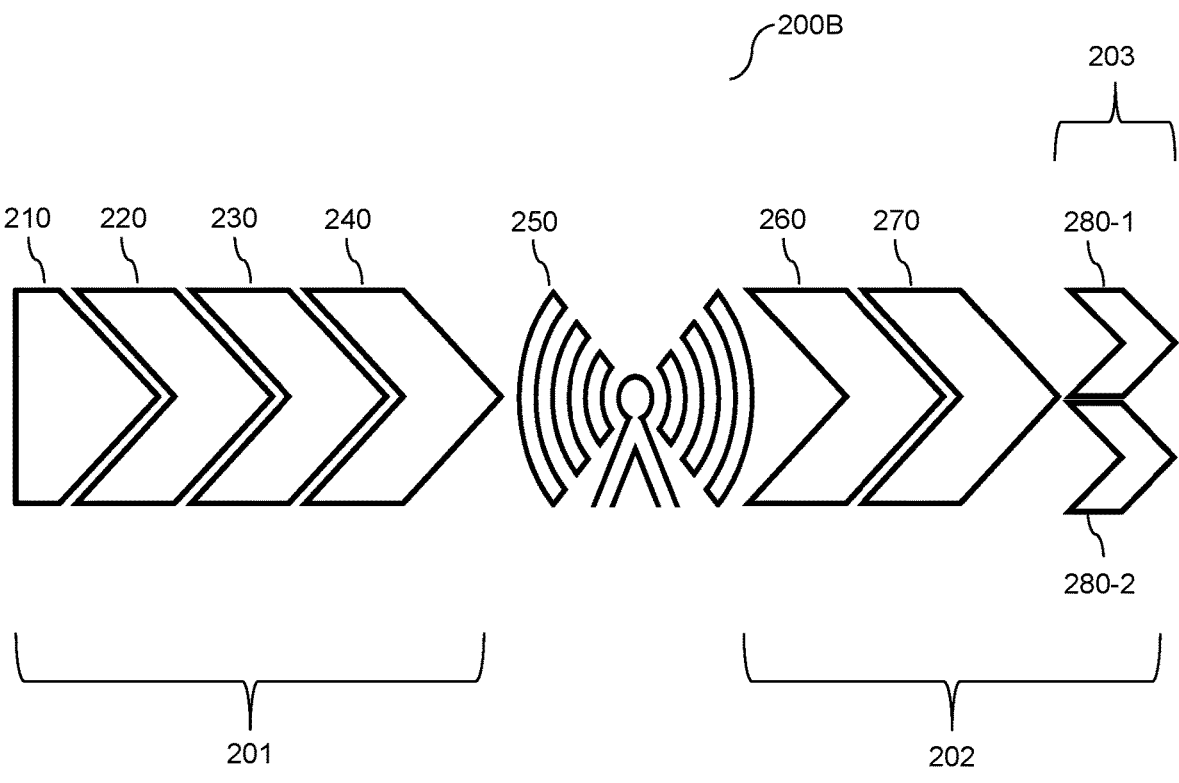
Figure 2C:
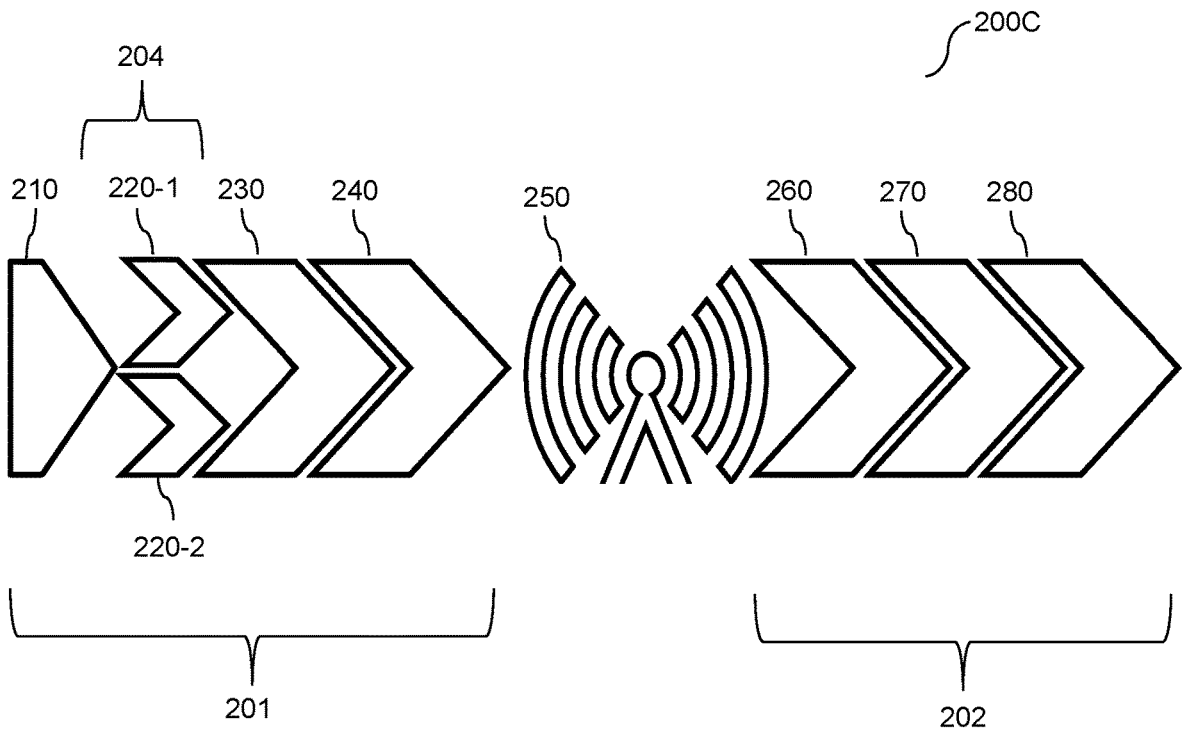

FIGS. 2A-C are non-limiting example illustrations of interactions chains 200A through 200C, respectively, which may be modeled in accordance with various disclosed embodiments.

As depicted in FIG. 2A, the non-limiting example interactions chain 200A includes links 210 through 280. Each link 210 through 280 may represent a corresponding type of component or a specific component. The example interactions chain 200A includes a vehicle link 210, a vehicle safety system link 220, a driver assistance system link 230, a vehicle network interface link 240, a network link 250, a remote operation system network interface link 260, a remote operation system link 270, and a remote operation input/output (I/O) device link 280. Each of the links 210 through 280 may represent a respective link type of a non-limiting example implementation.

Any or all of the components represented by the links 210 through 280 may include or be communicatively connected to a corresponding computing system or program which is configured to send signals indicating a status of the component or components. As discussed herein, such signals may be utilized in order to make decisions regarding safety maneuvers and, in particular, to determine where links in the chain may be broken (i.e., indicative of one or more components represented by that link having failed) in order to make decisions which may effectively assume failure of other components (i.e., components represented by other links).

The links 210 through 240 collectively form a set of vehicle-side links 201 which are deployed on a first side of a set of one or more networks represented by the network link 250, and the links 260 through 280 collectively form a set of remote operation-side links 202 which are deployed on a second side of the networks represented by the network link 250. In this regard, the logical arrangement of links into sets or other groupings of links may be utilized in accordance with at least some disclosed embodiments in order to aid in determining safety-related decisions. As a non-limiting example, rules used for determining which safety maneuvers to perform may define that all links among the set of remote operation-side links 202 are treated as disabled when the network link 250 is severed. In other words, if the vehicle cannot communicate with the remote system or systems over the networks represented by the network link 250, then it may be assumed that communications from each of the components represented by the links among the set of remote operation-side links 202 will not be received (i.e., so safety maneuvers which rely on such communications are not determined as the safety maneuvers to be performed.

Non-limiting example explanations of which components each of the links 210 through 280 represent will now be described. It should be noted that the various examples provided as follows are not necessarily limiting, and that different components or systems may be represented by any or all of the links 210 through 280 in at least some implementations.

The vehicle link 210 may represent one or more vehicle components of a vehicle which are utilized to control locomotion of the vehicle, one or more vehicle networking components used to enable communications with other components among the set of vehicle-side links 201 or via the networks represented by the network link 250, a combination thereof, and the like. In other words, the vehicle link 210 may effectively represent vehicle components used to enable safety maneuvers in coordination with components represented by other links in the interaction chain 200A. Non-limiting example components which may be represented by the vehicle link 210 include automotive control systems (e.g., engine, braking, steering, lights, etc.), central computing systems which are configured to manage other computing systems used by the vehicle, both, and the like.

In some implementations, the vehicle link 210 may also represent sensors installed in or deployed with the vehicle. Alternatively, one or more sensor links (not shown) may be further included among the chain of interactions. Such sensor links may represent one or more sensors installed on the vehicle such as, but not limited to, automotive sensors configured to monitor performance and provide data for corresponding vehicle parts, road sensors configured to monitor road conditions or circumstances and provide data about an environment in which the vehicle is moving (e.g., cameras, infrared sensors, light direction and ranging sensors, etc.), both, and the like.

The vehicle safety system link 220 may represent components including one or more safety systems of the vehicle. Such safety systems may be configured to perform automated actions to assist or control vehicle navigation when triggered (e.g., triggered by an obstacle or by unsafe driving behaviors detected while the vehicle is operating). Non-limiting example safety systems which may be represented by the vehicle safety system link 220 include airbag control units, backup camera systems (e.g., systems including backup cameras deployed toward a back side of a vehicle which are configured to send image data to a display unit), antilock braking systems, electronic stability control systems, traction control systems, combinations thereof, and the like.

The driver assistance system link 230 may represent components including one or more driver assistance systems of the vehicle. Such driver assistance systems may be configured to perform automated actions which control certain vehicle functions or project information in order to aid a driver in operating the vehicle (e.g., without necessarily taking full control of the vehicle). Non-limiting example driver assistance systems which may be represented by the driver assistance system link 230 include collision warning systems, lane departure warning systems, cruise control systems, blind spot warning systems, backup detection systems, emergency braking systems, combinations thereof, and the like.

The vehicle network interface link 240 represents one or more network interfaces or other components utilized to allow the vehicle to communicate via one or more networks represented by, for example, the network link 250.

The network link 250 may represent one or more networks such as, but not limited to, vehicle-to-vehicle (V2V) networks, vehicle-to-infrastructure networks, vehicle-to-everything networks, local area networks (LANs), wide area networks (WANs), the Internet, a combination thereof, and the like. In some embodiments, different networks may be represented by different network links (not shown) in order to, for example, model potential alternative networks which may be utilized in case of failure of one or more other networks.

In some implementations, the network link 250 (or multiple network links, when different network links are utilized to represent different networks) may effectively act as a logical separator between the vehicle-side links 201 and the remote operation-side links 202. That is, in such implementations, links which are arranged on a first side of the network link 250 (or the first in a series of network links) may be identified as vehicle-side links 201, and links which are arranged on a second side of the network link 250 (or the last in a series of network links) may be identified as remote operation-side links 202. As discussed herein, some rules used to determine safety maneuvers may, for example, treat all links among the remote operation-side links 202 as failed when the network link 250 is failed.

The remote operation system network interface link 260 represents one or more network interfaces or other components utilized to allow one or more remote systems to communicate with the vehicle via one or more networks represented by, for example, the network link 250.

The remote operation system link 270 may represent a server, user device, or other system which is configured to perform remote operations with respect to the vehicle (e.g., by sending commands to the vehicle). The remote operation system represented by the remote operation system link 270 may be automated or may be operated by a user. In some implementations, the remote operation system may be configured to initiate or otherwise control at least some safety maneuvers for the vehicle. Alternatively, the vehicle may be configured to initiate or control such safety maneuvers. In some implementations, the vehicle is configured to initiate or control minimal risk maneuvers (MRSM), and the remote operation system may be configured to initiate or control other safety maneuvers (e.g., less time-sensitive or otherwise less safety critical maneuvers).

The remote operation input/output (I/O) device link 280 may represent one or more I/O devices utilized to accept inputs from a user, to project outputs to a user (e.g., by displaying visuals, projecting audio, etc.), or both. Such inputs and outputs may be part of a system used to allow a user to remotely control vehicle operations via the remote operation system represented by the remote operation system link 270. Non-limiting examples of such I/O devices may include, but are not limited, to, mouse, keyboard, joystick, steering wheel, brake pedal, gas pedal, displays, speakers, combinations thereof, and the like.

As illustrated in FIG. 2B, the interactions chain 200B includes two I/O device links 280-1 and 280-2. As depicted in FIG. 2B, the I/O device links 280-1 and 280-2 are connected to the remote operation system link 270 in a branching manner, that is, each of the I/O device links 280-1 and 280-2 branch off of the remote operation system link 270 rather than proceeding in a sequential manner. As discussed herein, such branching of links may be utilized to represent links where failure of one link does not necessarily render the status of the other link uncertain such that sequentially ordering the links would result in at least some false positive detection of link failures which, in turn, would affect accuracy of determining which safety measures can be performed safely.

That is, in the implementation shown in FIG. 2B, the links 280-1 and 280-2 collectively form a third set of I/O links 203. In at least some implementations, if the remote operation system represented by the remote operation system link 270 fails, the links 280-1 and 280-2 of the set of I/O links 203 may be treated as failed for purposes of determining safety measures such that safety measures which would require inputs from one of the input devices 280-1 or 280-2 will not be selected or otherwise utilized while the remote operation system remains in a failed state. On the other hand, if one of the links 280-1 or 280-2 breaks because the corresponding I/O device represented by that link 280-1 or 280-2 fails, then safety measures which only rely on the other link may continue to be selected and utilized. As a non-limiting example, if the link 280-1 represents a steering wheel input device and the link 280-2 represents a keyboard, when the keyboard fails, safety measures which only require inputs from the steering wheel and do not require inputs from the keyboard may continue to be selected and utilized.

As illustrated in FIG. 2C, a fourth set of vehicle safety system links 204 including vehicle safety system links 220-1 and 220-2 is included among the chain of interactions 200C. Further, as depicted in FIG. 2O, the links 220-1 and 220-2 branch off of a main chain beginning with the link 210 and then merge back into the main chain via the link 230. That is, the links 220-1 and 220-2 are represented such that failure of one of the links 220-1 and 220-2 will not result in determining that the other link should be treated as failed, but that failure of either of the links 220-1 or 220-2 may result in any or all of the other links among the links 230 through 280 being treated as failed depending on the rules used for determining safety maneuvers for a given implementation.

It should be noted that a single set of branching links (i.e., the set of I/O links 203 or the set of vehicle safety system links 204) is depicted in each of FIGS. 2B and 2C for example purposes, but that the disclosed embodiments are not necessarily limited as such. As a non-limiting example, multiple sets of branching links may be included among the chain of interactions, and each of those sets of branching links may either merge back into the main chain (as depicted for the set of vehicle safety system links 204) or may further branch off into additional sets of branching links (not depicted in FIGS. 2A-C) without departing from the scope of the disclosure. Further, some links among a set of branching links may merge back into the main chain while other links among the same set of branching links may not merge back into the main chain (i.e., such that failure of that branching link does not necessarily affect failure of any other links along the main chain). Moreover, only two branching links are depicted in each of the sets of branching links 203 and 204 shown in FIGS. 2B-C, but that more than two branching links may be included in any given set of branching links without departing from the scope of the disclosure.

It should also be noted that the interactions chains 200A through 200C illustrated in FIGS. 2A-C are presented for example purposes and without limitation on the disclosed embodiments. Other components, devices, systems, and the like may be modeled as interaction links via interactions chains without departing from the scope of the disclosure. As discussed herein, any or all of the components represented by the links depicted in FIGS. 2A-C may be more granularly represented using their own links. As a non-limiting example, multiple network links may correspond to respective networks rather than using a single network link 250 as depicted in FIGS. 2A-C. Likewise, fewer than all of the links in the interactions chain 200 depicted in FIGS. 2A-C may be modeled and utilized without departing from the scope of the disclosure. Any interaction links may be realized via hardware, software, or a combination thereof.

Figure 3A:
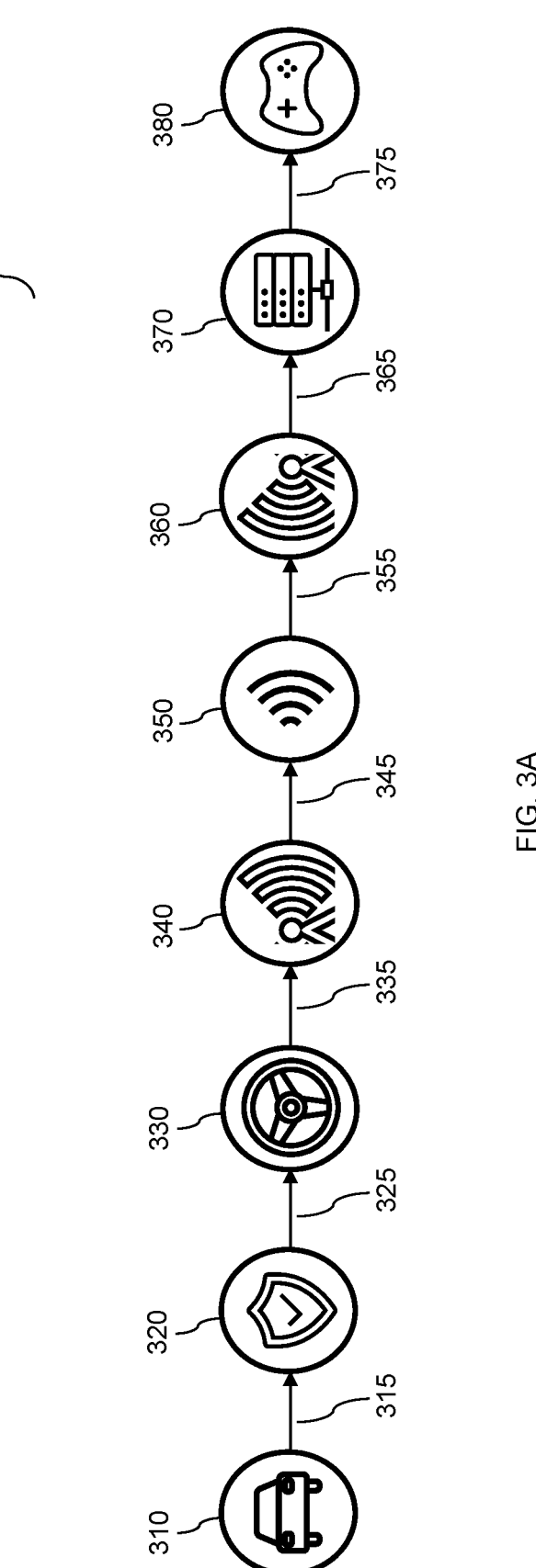
FIGS. 3A-C are illustrations of interactions chain data structures.
Figure 3B:
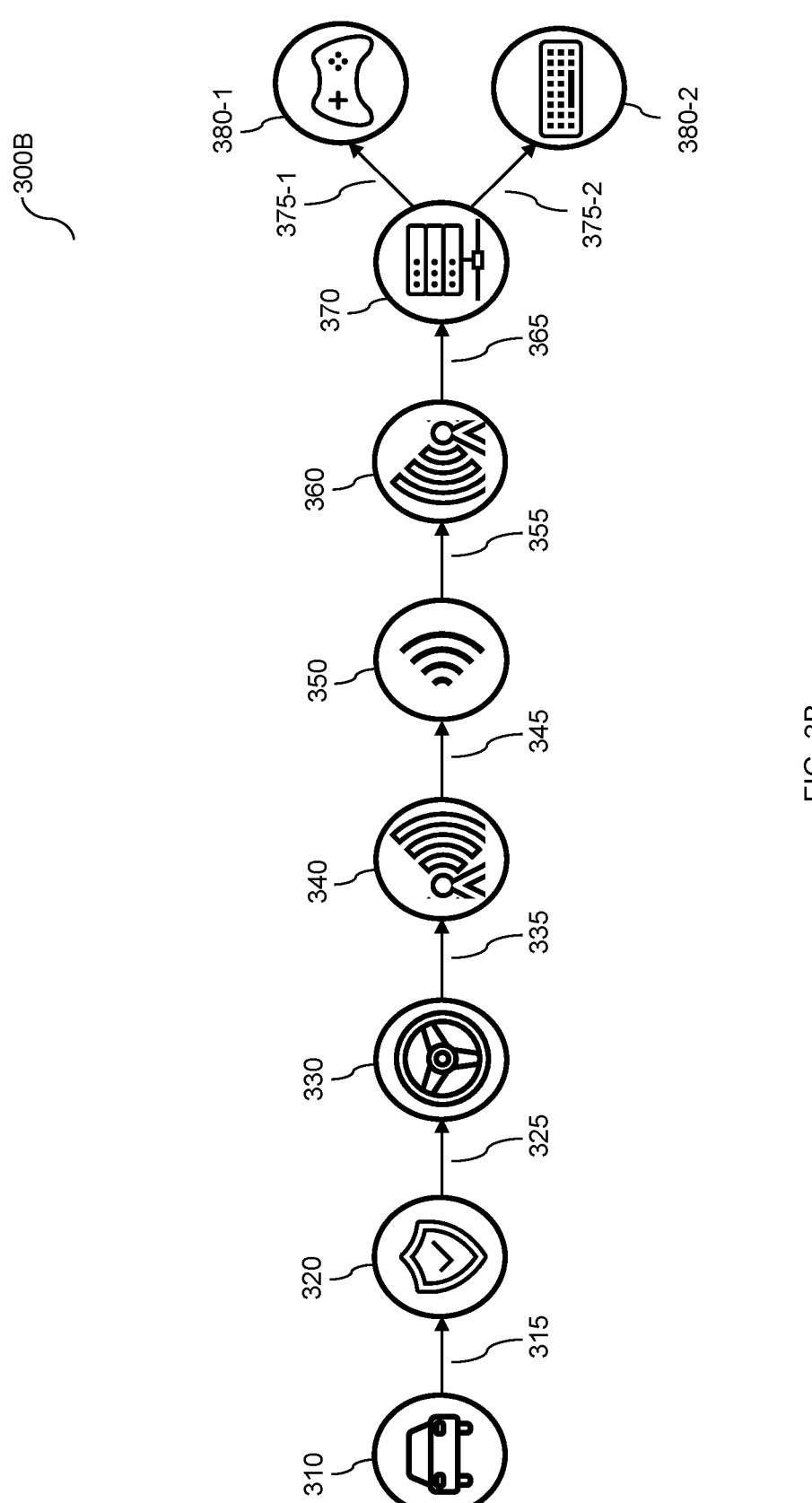
Figure 3C:
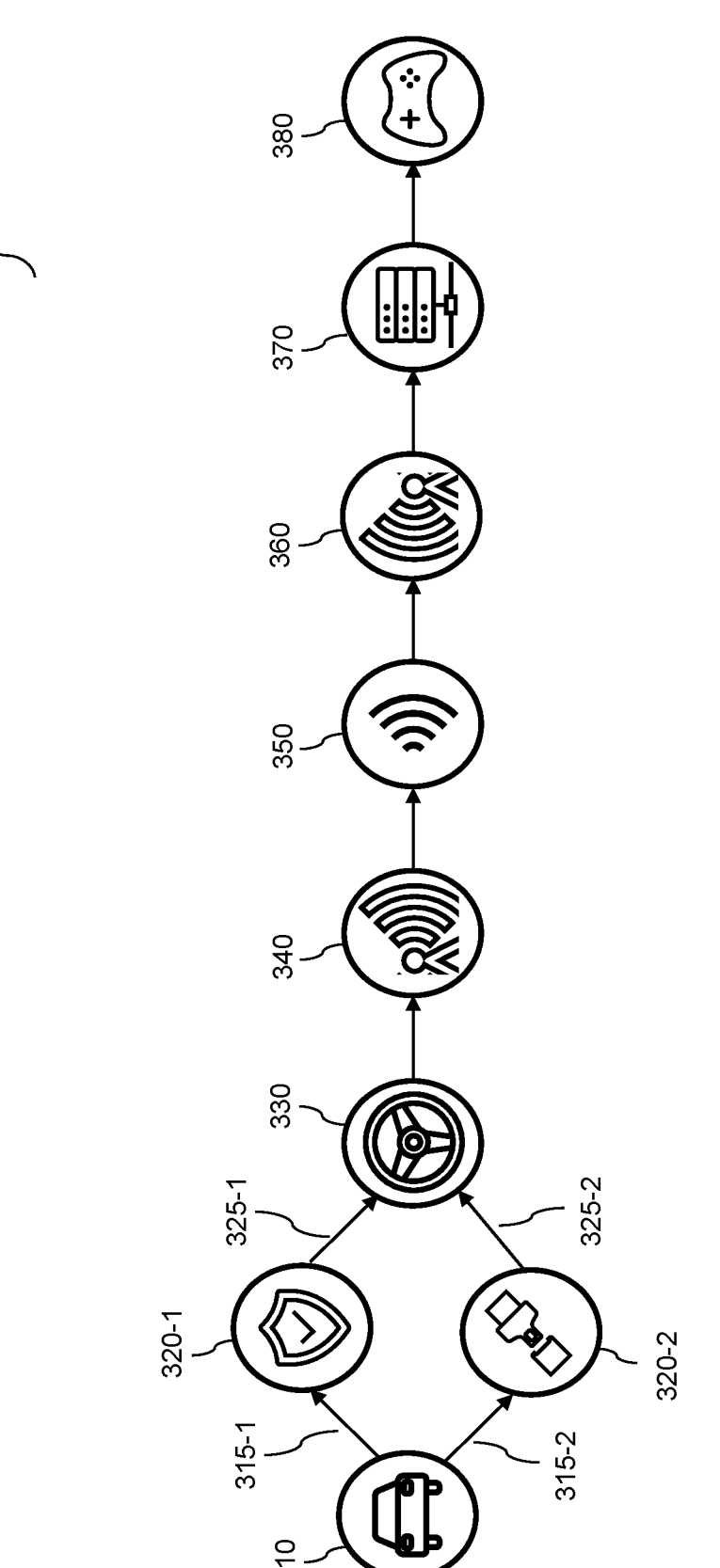

FIGS. 3A-C illustrations representing interactions chain data structures 300A through 300C, respectively. Specifically, in an example implementation, the interactions chain data structures 300A through 300C may represent the interactions chains 200A through 200C, respectively. FIGS. 3A-C demonstrate an implementation in which the interactions chain data structures 300A through 300C are realized as graph data structures including respective nodes and edges.

As depicted in FIG. 3A, the example interactions chain data structure 300A includes multiple nodes 310 through 380. In the non-limiting example illustrated in FIG. 3A, the nodes 310 through 380 include a vehicle link node 310, a vehicle safety system link node 320, a driver assistance system link node 330, a vehicle network interface link node 340, a network link node 350, a remote operation system network interface link node 360, a remote operation system link node 370, and a remote operation input/output (I/O) device link node 380. In an example implementation, the nodes 310 through 380 may represent the corresponding links 210 through 280, respectively.

As shown in FIG. 3A, the nodes 310 through 380 may be nodes of different types which are visually represented in FIG. 3A via different icons. Accordingly, the implementation shown in FIG. 3A utilizes a heterogeneous interactions chain data structure 300A, although the disclosed embodiments are not necessarily limited to heterogeneous chain data structures. More specifically, each node 310 through 380 may have a corresponding set of node data including, but not limited to, a status of the component represented by the link of that node.

The corresponding set of node data for each node may further include data indicating a type for the node such as a tag or other metadata indicating the node type. As discussed herein, different types of nodes may be leveraged via rules, for example, to facilitate determining safety maneuvers to be performed in a given situation. As a non-limiting example, the rules may define connections between nodes with respect to type such that certain combinations of nodes connected via respective edges having certain node types may be subject to particular rules defining how to analyze the chain of interactions (e.g., how failure of a component represented by a link in the chain affects failure status of components represented by other nodes in the chain with respect to identifying available safety maneuvers with respect to non-failed components), while other combinations of nodes of other types may be subject to other rules defining how to analyze the chain of interactions.

Also depicted in FIG. 3A are multiple edges 315 through 375, where each edge 315 through 375 represents a connection between a corresponding pair of nodes among the nodes 310 through 380. In the example implementation shown in FIG. 3A, the interactions chain data structure 300A is realized as a directed graph where the edges 315 through 375 have corresponding orientations or otherwise have respective directionalities. As discussed herein, the directionalities of edges between nodes may be utilized to aid in determining safety maneuvers, for example, by determining that components downstream from other components (e.g., as determined by edges pointing in the direction of the nodes representing the downstream components) may be determined as failed when a component upstream (e.g., as determined by edges pointing away from the direction of the node representing the upstream component) has failed.

As also discussed herein, some instances of failures of such upstream nodes (i.e., nodes representing components which are upstream of other components in the chain of interactions) may not lead to determining at least some downstream nodes (i.e., nodes representing components which are downstream from the upstream components) represent failed components. In other words, in some embodiments, failure of a first component may lead to determining that some second components which are downstream from that upstream first component are also treated as failed for purposes of determining safety maneuvers, but that other third components which are downstream from the upstream third component are not treated as failed for purposes of determining safety maneuvers.

FIG. 3B illustrates the interactions chain data structure 300B representing the interactions chain 200B depicted in FIG. 2B. As illustrated in FIG. 3B, two remote operation I/O device link nodes 380-1 and 380-2 are connected to the remote operation system link node 370 in a branching manner via respective edges 375-1 and 375-2. In an example implementation using the interactions chain data structure 300B, a value indicating that a remote operation system represented by the remote operation system link node 370 may result in treating the I/O device represented by the node 380-1, by the node 380-2, or both, as failed (i.e., even if the status values for either or both of these nodes 380-1 and 380-2 indicate that their respective I/O devices are active or otherwise non-failed). In another example implementation, a value indicating either the failure of the I/O device represented by the node 380-1 or by the node 380-2 will not result in determining that the I/O device represented by the other node 380-1 or 380-2 has failed because neither I/O device node 380-1 or 380-2 is upstream from the other.

FIG. 3C illustrates the interactions chain data structure 300C representing the interactions chain 200C depicted in FIG. 2C. As illustrated in FIG. 3C, two vehicle safety system link nodes 320-1 and 320-2 are disposed between the vehicle link node 310 and the driver assistance system link node 330. More specifically, the vehicle safety system link node 320-1 is connected to the vehicle link node 310 via an edge 315-1, and is connected to the driver assistance system link node 330 via an edge 325-1. Likewise, the vehicle safety system link node 320-2 is connected to the vehicle link node 310 via an edge 315-2, and is connected to the driver assistance system link node 330 via an edge 325-2.

In an example implementation, failure of the vehicle safety system component represented by either the node 320-1 or 320-2 may result in treating one or more of the components represented by the nodes 330 through 380 as being failed for purposes of determining safety maneuvers, but failure of the vehicle safety system represented by one of the nodes 320-1 or 320-2 will not necessarily result in treating the component represented by the other node 320-1 or 320-2 as being failed.

It should be noted that the interactions chain data structures 300A through 300C are depicted as directed graphs for example purposes only and without limitation on the disclosed embodiments. In at least some embodiments, interactions chain data structures may be realized as graphs which are not directed graphs without departing from the scope of the disclosure. In embodiments where directed graphs are utilized, the directionality of the edges may be used to facilitate application of rules used for identifying available safety measures and determining safety measures to be performed, for example, by defining such rules with respect to directionalities of edges.

Additionally, it should be noted that the nodes illustrated in FIGS. 3A-C are each depicted using a different icon merely for example purposes, but that the nodes in a given interactions chain data structure may be homogeneous (i.e., all nodes are the same type of node), heterogeneous (i.e., all nodes are different types), or partially heterogeneous (i.e., some of the nodes are the same type as each other while being different types from at least some other nodes). In other words, a given interactions chain data structure may be at least partially heterogeneous such that some or all of the nodes are different types from each other. Using different types of nodes may further facilitate applying rules to identify available safety maneuvers and determine safety maneuvers to be performed, for example, by defining such rules with respect to types of nodes.

Figure 4:
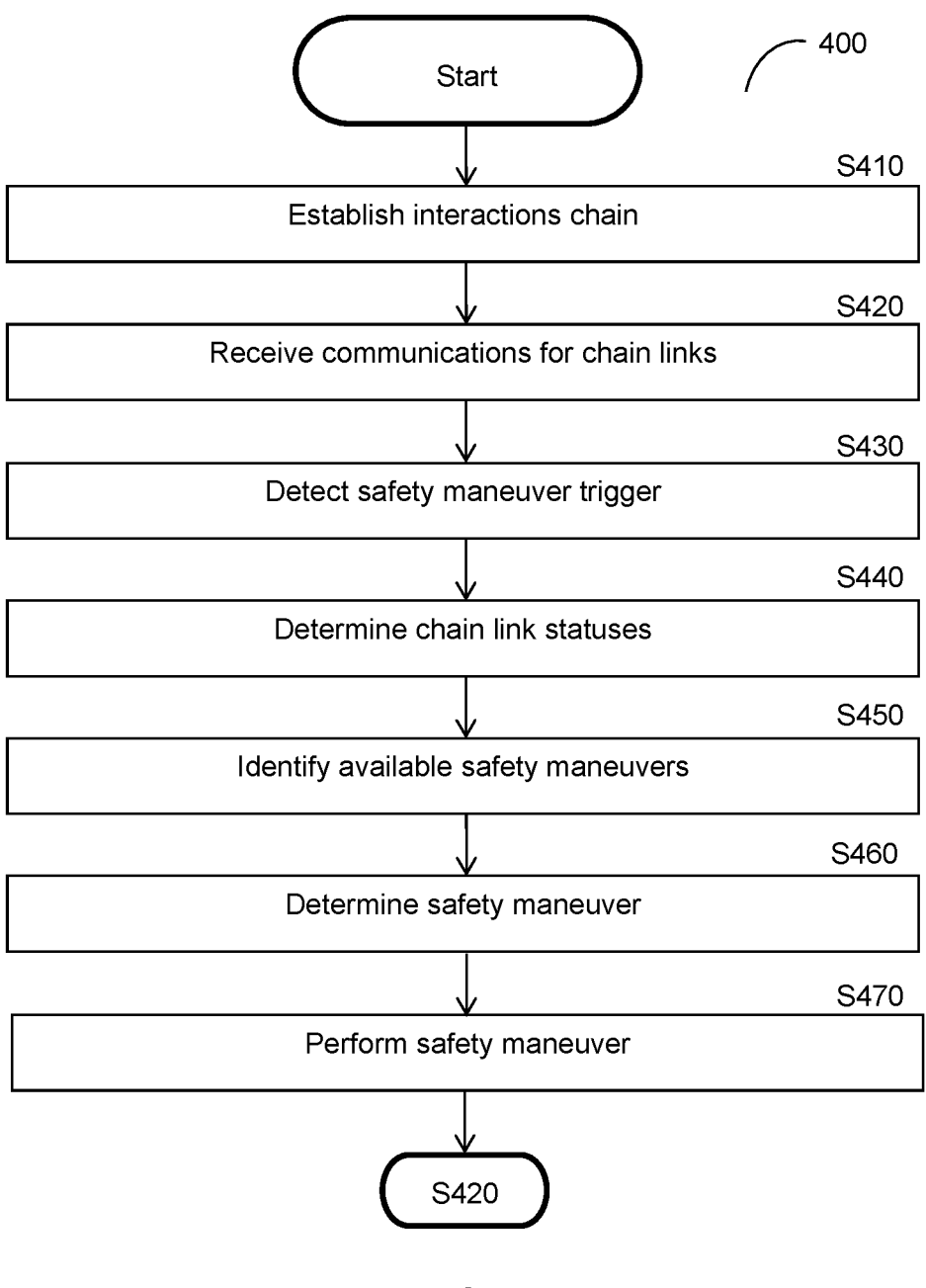
FIG. 4 is a flowchart illustrating a method for performing safety maneuvers for a vehicle operating at least partially remotely according to an embodiment according to an embodiment.

FIG. 4 is a flowchart 400 illustrating a method for performing safety maneuvers for a vehicle operating at least partially remotely according to an embodiment. In an embodiment, the method is performed by the maneuver manager 130, FIGS. 1A-B.

At S410, an interactions chain is established. In an embodiment, establishing the interactions chain includes creating an interactions chain data structure representing the interactions chain. The interactions chain represents a series of interactions between components which collectively allow for operating the vehicle and, in accordance with various disclosed embodiments, may collectively allow for operating the vehicle at least partially remotely (e.g., using commands sent to the vehicle). The interactions chain may be represented as a series of links arranged in an order, for example but not limited to, one of the orders discussed above with respect to FIGS. 2A-C.

In an embodiment, the interactions chain data structure may be realized as a graph including nodes and edges, where at least some of the nodes represent respective links in the chain of interactions. Edges between nodes representing links may represent failure-related connections between those links. In other words, in at least some circumstances, when a component represented by a node on one side of an edge has failed, a component represented by a node on the other side of the edge may also be treated as failed (e.g., for purposes of identifying available safety maneuvers and for determining safety maneuvers to perform). Rules defining such circumstances may be utilized to identify available safety maneuvers and to determine safety maneuvers as discussed herein.

An example process which may be utilized to create an interactions chain data structure is described further below with respect to FIG. 5.

At S420, communications are received for chain links represented in the interactions chain. In some embodiments, a signal or other communication is received for one or more components represented by each chain link. In a further embodiment, such a signal or communication is received for each chain link repeatedly, for example, periodically. As a non-limiting example, a packet containing such a signal or communication may be received for each chain link at periodic intervals (e.g., every 50 milliseconds).

In some implementations, each component represented by one of the chain links may send such a signal at periodic intervals. When a signal indicating that the component has failed is received, or when a signal is not received from that component within a predetermined period of time (e.g., a period of time determined based on the time interval at which the component sends such signals), it may be determined that the component is failed or otherwise inactive (e.g., as discussed further below with respect to S440).

As discussed herein, such signals or communications may be used to check the status of different components represented among the interactions chain over time. For example, if signals cease being received for a given link or if signals for that link indicate that one of the components represented by that link have failed, it may be determined that the link is broken and its components should be treated as failed at least until a signal indicative of the link being active (e.g., a signal indicating an active-representing value or otherwise a signal received after signals ceased being received for the link) is subsequently received. Further, as discussed herein, some or all of the components downstream of the components represented by that link may also be treated as failed in at least some situations where a link is broken.

In this regard, it is noted that safety maneuvers are often performed in time-sensitive situations, and determining whether certain components between a vehicle and a remote system have failed may take more time than is permitted given the circumstances. By actively checking to see if signals indicative of active status are received (e.g., at regular intervals), it can be promptly determined whether certain components should be assumed to have failed for purposes of making safety maneuver decisions. This, in turn, improves safety of the vehicle when operating under circumstances where at least some vehicle operations would otherwise be performed remotely. That is, the periodic intervals for checking statuses may be set in fractions of a second such that potential changes in status can be reacted to quickly, thereby ensuring maximum safety for the vehicle.

In an embodiment, the communications include binary signals for each chain link. In such an embodiment, each binary signal may indicate whether one or more components represented by that link are active or have failed. As a non-limiting example, a signal with a value of 0 may indicate that the link is active and a signal with a value of 1 may indicate that the link has failed, or vice versa (e.g., value of 0 indicates that link has failed and value of 1 indicates that link is active). Using binary signals to check statuses may further improve efficiency of the process in a manner that improves safety of the vehicle. That is, such binary values can be processed more quickly and using fewer computing resources than more complex signals. Accordingly, using binary values as simplified representations of link statuses allows for making decisions related to safety maneuvers faster which, as noted above, improves safety of the vehicle when safety maneuver decisions must be made in time-sensitive situations.

In another embodiment, the communications may include signals other than a single binary signal for each chain link. As a non-limiting example, such communications may include an error stream for a failed component indicating a type of error, potential causes of the error, both, and the like. Such more detailed communications may help improve analysis of potential safety maneuvers.

Moreover, in some embodiments, a mixture of binary values and more complex communication data may be sent. In a further embodiment, a binary value may be sent when a component represented by a link is functional or otherwise has not failed, while an error stream (e.g., an error stream including data indicating a type or source of an error) may be sent when the component has failed. Such an embodiment may allow for minimizing the amount of data transmitted when components have not failed (thereby reducing the total amount of data to be transmitted and analyzed when components are functioning properly) while providing additional context for components which have failed. Such a mix of binary values for intact links and non-binary data for broken links may allow for minimizing computing resources spent on analyzing links which do not have any issues, thereby allowing for investigating potential issues related to broken links more quickly and conserving computing resources for the overall process.

In an embodiment, the communications are received in one or more uniform formats which are known to the maneuver manager (e.g., predetermined formats recognized in software instructions used to realize the maneuver manager). To this end, in a further embodiment, the signals are received via one or more rules, protocols, or combinations thereof. Such a set of rules, protocols, or both, may be realized via one or more application programming interfaces (APIs). The formats of the signals received via the APIs may be one or more uniform signal formats recognized by the maneuver manager. That is, each API may be utilized to determine a signal in a second format based on a signal in a first format, where the first format is a format utilized by the component or system sending the signal and the second format is a format utilized by the maneuver manager.

At S430, a safety maneuver trigger is detected. In an embodiment, the safety maneuver trigger is detected based on sensor signals from one or more systems installed on the vehicle or otherwise configured to monitor vehicle activities for potential dangers. In a further embodiment, detecting the safety maneuver trigger includes applying one or more safety maneuver trigger detection rules defined with respect to sensor signals of sensors installed on or otherwise deployed with respect to the vehicle.

As a non-limiting example, safety systems installed on the vehicle may be configured to monitor sensor signals from vehicle parts in order to determine if any of those vehicle parts have failed, to monitor sensor signals from cameras installed on the vehicle to identify unsafe driving conditions, and the like. Such events may be utilized to detect a trigger for a situation where a safety maneuver such as a minimal risk maneuver (MRM) should be performed in order to keep the vehicle, its occupants, nearby bystanders, and the like, safe.

Alternatively or in combination with safety maneuver triggers defined with respect to sensor signals of sensors deployed with the vehicle, the safety maneuver triggers may include interactions chain safety maneuver triggers defined with respect to the interactions chain. Such interactions chain safety maneuver triggers may define one or more safety maneuver triggers based on, for example, broken links. That is, when one or more links in the chain switch from an active status to a failed status, such a switch may be detected as a trigger to perform a safety maneuver. Moreover, in some embodiments, only certain links or certain types of links becoming broken (i.e., switching from active status to failed status) may be detected as a safety maneuver trigger.

To this end, in a further embodiment, detecting the safety maneuver trigger may include checking statuses of chain links in the chain of interactions in order to determine whether any chain links are broken. Checking statuses of chain links is described further below with respect to S440. Accordingly, in such an embodiment, the chain link statuses may be checked prior to or at S430, either in addition to checking the chain link statuses at S440 or instead of checking the chain link statuses at S440.

In another embodiment, the safety maneuver trigger may be detected based on network conditions for the vehicle. That is, in such an embodiment, one or more triggers for performing a safety maneuver may be defined with respect to network conditions of a vehicle and, in particular, of a vehicle for which at least some operations are being performed, controlled, or otherwise initiated remotely. Such network conditions may be or may include network conditions currently being experienced by the vehicle, or expected future network conditions determined based on a navigation route for the vehicle.

To this end, the safety maneuver trigger detection rules may include at least some rules defining network conditions which are either considered safe (i.e., such that they do not trigger a safety maneuver) or unsafe (i.e., such that they do trigger a safety maneuver). In a further embodiment, the network condition-based safety maneuver trigger detection rules may be defined with respect to network metrics such as, but not limited to, latency, jitter, packet loss, throughput, speed, bandwidth, network availability, packet duplication, error rate round-trip time, combinations thereof, and the like. As a non-limiting example, the safety maneuver trigger detection rules may define a predetermined threshold for packet loss such that, when packet loss for the vehicle exceeds the threshold, a safety maneuver trigger is detected.

In this regard, it is noted that effective remote operation of a vehicle over one or more networks relies upon network conditions. That is, if network conditions are poor, commands to perform safety maneuvers may not be received timely, or circumstances requiring a safety maneuver may not be detected at all. For example, when there is significant lag, video data may take longer to receive on the remote operation system's end and, consequently, the remote operation system may not be able to detect other safety maneuver trigger events. By using at least some safety maneuver triggers defined with respect to network conditions, safety of the vehicle may be improved as compared to solutions which do not account for network conditions. That is, triggering safety maneuvers when network conditions are poor may avoid situations where other safety maneuver triggers are not detected or where a safety maneuver trigger is detected but network conditions have degraded such that the vehicle does not receive the command to perform the safety maneuver in time to avoid an accident.

It is also noted that some contexts may require certain components to remain active at all times in order for the vehicle to operate safely such that failure of one of these components may require performing a safety maneuver in order to ensure safe operation of the vehicle. As a non-limiting example, a vehicle which is remotely operated based on video feed from the vehicle may not be possible to operate safely when the camera fails or the video feed is otherwise not being received remotely. Thus, failure of a camera or of a network interface used by the vehicle to capture or transmit the video feed may result in detecting a trigger for performing a safety maneuver which does not utilize the video feed.

At S440, chain link statuses are determined for chain links among the interactions chain. In an embodiment, the chain link statuses are determined based on the received communications. In a further embodiment, each chain link status is determined as either intact (e.g., when the components represented by the chain link are active or otherwise have not failed) or broken (e.g., when one or more of the components represented by the chain link have failed). In other words, a chain link may be considered intact when the components represented by the chain link are functioning, and a chain link may be considered broken when one or more of the components represented by the chain link are not functioning (or it otherwise cannot be determined whether any or all of the components have failed).

In an embodiment, each chain link status is determined based on signals received from or with respect to one or more components represented by each chain link over time. More specifically, such signals may indicate whether the component has failed such that, if a signal indicating such failure is received for a given component, the chain link representing that component may be considered failed for at least some identifications of available safety maneuvers. As discussed herein, such signals may be realized via a binary value which can be transmitted and analyzed efficiently and quickly, thereby allowing for efficiently determining chain link statuses for use in identifying available safety maneuvers.

In a further embodiment, such signals may be received periodically at regular intervals. In such an embodiment, if no signal is received for a given component within a predetermined period of time or otherwise within a period of time corresponding to the time intervals at which the signals are received for the component (e.g., as determined based on an average time between signals for that component), it may be determined that the component has failed and, consequently, that the chain link representing that component is broken. Accordingly, when no signal is received for a component within such period of time, the status of the chain link representing the component may be determined as broken.

At S450, available safety maneuvers are identified for the vehicle based on the determined chain link statuses. In an embodiment, the available safety maneuvers include safety maneuvers supported by a current state of interactions between the vehicle and one or more remote systems as determined based on the chain link statuses. Maneuvers which are supported by a current state of interactions may include maneuvers which would utilize components which are active or otherwise not failed, for example as indicated by the corresponding chain links representing those components having statuses of intact. More specifically, in a further embodiment, available safety maneuvers are safety maneuvers which only use components which are represented by intact chain links. In other words, in such an embodiment, maneuvers which use any components which have failed or are otherwise represented by broken chain links are determined to be unavailable and are not determined as available safety maneuvers.

As a non-limiting example, when a camera used to capture video of the environment around the vehicle has failed and the chain link representing the camera has a status of broken, steering commands may be determined to not be available safety maneuvers, and a steering command will not be selected as one of the safety maneuvers to be performed by the vehicle. That is, because steering cannot be performed safely without video feed, one or more links being broken that would prevent the system which performs steering from receiving video, steering may be avoided when such video feed is unavailable. Instead, one or more safety maneuvers which do not require video may be performed.

As noted above, in at least some situations where safety maneuvers must be performed, performance of the safety maneuvers may be time-critical. In such situations, there may not be sufficient time to perform a detailed investigation into exact components, features, subsystems, programs, or other subcomponents which may have failed in order to determine what safety maneuvers can be performed. On the other hand, naively assuming that all safety maneuvers are available may sometimes result in attempting to perform a safety maneuver which cannot be performed safely due to failure of one or more components used for interactions between the vehicle and remote systems. By using a chain of interactions as discussed herein to track interactions between components in the chain of interactions which might be affected by failure of other components, the disclosed embodiments effectively allow for automatically making assumptions about available safety maneuvers which allow for identifying the potential safety maneuvers more quickly even as compared to other automated solutions while avoiding falsely identifying available safety maneuvers which are not actually available.

In a further embodiment, the available safety maneuvers are determined based further on a type of the vehicle. More specifically, different predetermined types of vehicles may have corresponding safety maneuvers which the vehicle is configured to perform by default. Such types of vehicles may be defined with respect to make, model, software programs installed, versions of such software programs, whether the vehicle came installed with or had installed additional components, combinations thereof, and the like. To this end, in such an embodiment, identifying the available safety maneuvers includes checking a data set indicating predetermined types of vehicles with corresponding sets of predetermined safety maneuvers based on a type of the vehicle for which a safety maneuver is to be performed in order to determine potential safety maneuvers that the vehicle would normally be capable of performing.

Based on the set of potential safety maneuvers that the vehicle would normally be capable of performing, a set of available safety maneuvers excluding safety maneuvers which are not viable due to broken chain links may be determined and identified as the available safety maneuvers. The type of the vehicle may be determined, for example, based on data from the vehicle indicating information about the type of vehicle, from one or more databases storing data about the vehicle (e.g., a database provided by a manufacturer of the vehicle), both, and the like.

At S460, one or more safety maneuvers are determined. In an embodiment, determining the safety maneuvers includes applying one or more safety maneuver determination rules.

Such safety maneuver determination rules may be defined based on factors such as, but not limited to, a type of safety maneuver trigger (e.g., as detected at S430), current operational parameters for the vehicle (e.g., speed, direction, etc.), maps or other navigation-related data about an area surrounding a current location of the vehicle, combinations thereof, and the like. In a further embodiment, the determined safety maneuver is selected from among the available safety maneuvers identified at S450. To this end, in such an embodiment, the safety maneuver determination rules further define that the safety maneuver to be determined is to be selected from among such available safety maneuvers for the vehicle.

At S470, the determined safety maneuvers are performed. In an embodiment, performing the safety maneuvers may include sending commands to automated systems of the vehicle (e.g., automated driving systems, vehicle assistance systems, etc.) to perform the determined safety maneuvers, thereby initiating the determined safety maneuvers. Accordingly, in such embodiments, performing the determined safety maneuvers further includes initiating the determined safety maneuvers.

In an embodiment, once the determined safety maneuvers have been performed, execution may continue with S420 where additional communications are received and monitored for subsequent safety maneuver triggers.

Figure 5:
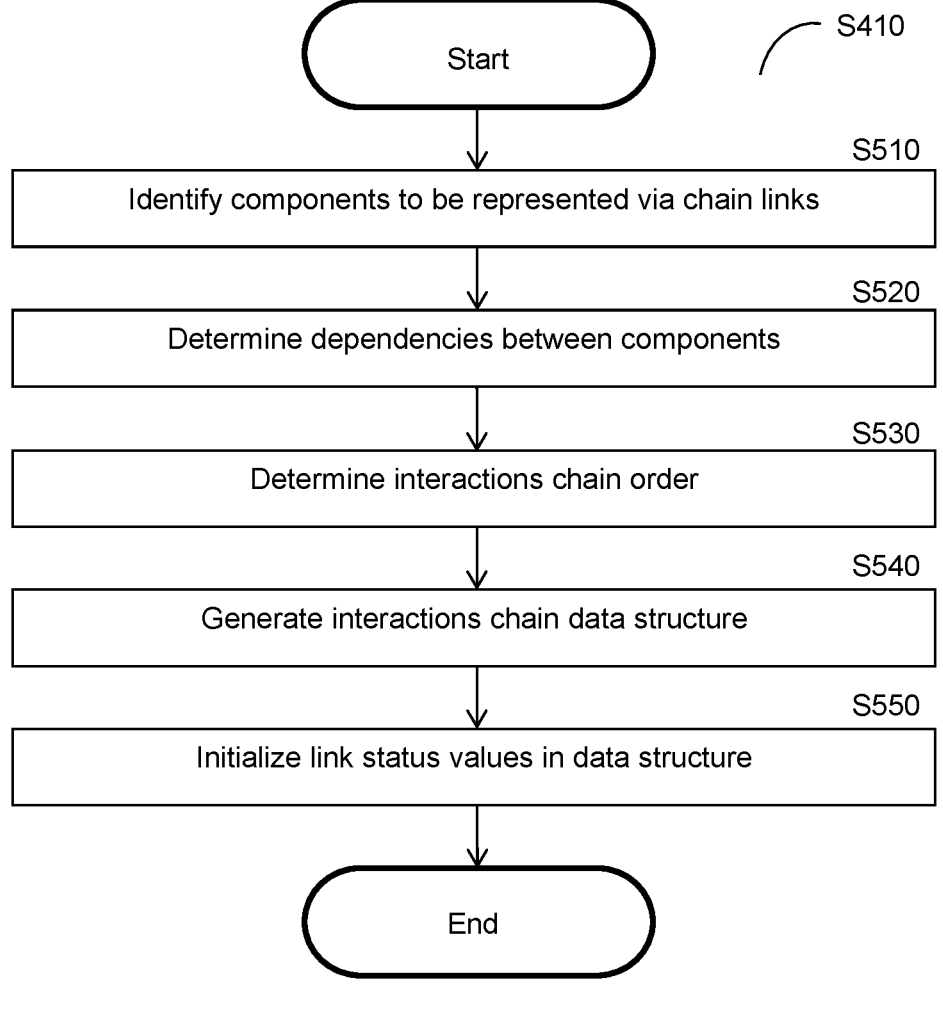
FIG. 5 is a flowchart illustrating a method for creating a chain data structure according to an embodiment.

FIG. 5 is a flowchart S410 illustrating a method for creating a chain data structure according to an embodiment.

At S510, components to be represented via chain links of an interactions chain are identified. In an embodiment, the components to be represented may be identified based on signals received by the vehicle or by a system configured to manager safety maneuvers by the vehicle (e.g., the maneuver manager 130, FIGS. 1A-B). Such signals may include an identifier of the component or may otherwise be received from a particular source (e.g., the component), which in turn may be utilized to identify the component.

In some embodiments, at least some of the components to be represented may be determined based on a type of the vehicle, based on other components to be represented, or both. To this end, component determination rules indicating predetermined components or types of components known to be in certain types of vehicles, known to be used together with other components or types of components, or both, are applied in order to determine at least some of the components to be represented.

As a non-limiting example for determining components to be represented by a type of vehicle, when a type of the vehicle is bus, it may be determined that folding doors are to be represented as a component in the chain of interactions based on a predetermined association between bus type vehicles and folding door components.

As a non-limiting example for determining certain components to be represented based on other components already determined, when one of the components determined to be represented is a steering wheel, it may be determined that a set of pedals is also a component to be represented based on a predetermined association between steering wheel components and pedal components.

At S520, dependencies between the identified components are determined. In an embodiment, the dependencies are determined based on communications between the identified components and, more specifically, communications of data between components in which the data communicated by one component is used by another component in order to perform a respective task of that component. That is, when a first component uses data from a second component, it may be determined that the first component is dependent on the second component for a task performed by the first component. Such dependencies may be utilized to determine where chain links among the chain connect (i.e., such that nodes representing those links are connected via an edge) as well as to determine an order between those components.

In an embodiment, the dependencies are determined based further on types of the components represented by chain links of the interactions chain. In such an embodiment, determining the dependencies may include identifying a type of each component with respect to a set of predefined types of components which may be represented by chain links among the interactions chain, and identifying predetermined relationships between types of components among the set of predefined types of components. Such predetermined relationships may define certain known types of components having a dependent relationship (i.e., a known relationship where one component depends on data provided by another component).

As a non-limiting example, a camera installed on a vehicle may provide video data to a network interface of the vehicle for the purpose of allowing the network interface to perform the task of transmitting the video data over one or more networks. In such an example, the network interface may be determined as dependent on the camera such that a node representing the network interface may be connected to a node representing the camera via an edge in the resulting interactions chain data structure, and the order between the camera and the network interface may be determined such that the camera is earlier in the order than the network interface.

At S530, an interactions chain order is determined for the interactions chain based on the dependencies between the identified components. In an embodiment, determining the interactions chain order includes applying order determination rules to the identified components and determined dependencies in order to determine an order of components with respect to interactions between the vehicle and a remote system. As noted above, dependencies between pairs of components may be determined based on which component uses data from another component such that failure of the component which provides the data used by the other component may result in treating the other component which uses the data as failed.

In a further embodiment, the chain links of the interactions chain are ordered at least such that chain links representing components installed on or otherwise deployed with the vehicle are earlier in the order than chain links representing networks, chain links representing components installed on or otherwise deployed with remote systems (i.e., systems which are remote from the vehicle), or both.

At S540, an interactions chain data structure is generated based on the identified components, the determined dependencies, and the determined interactions chain order. The interactions chain data structure includes data representing each chain link of a set of chain links, where each chain link in turn represents one or more components used in a chain of interactions between the vehicle and one or more remote systems. The interactions chain data structure also includes data indicating connections between the chain links, e.g., connections representing dependencies between chain links used to define the order of the chain links within the chain of interactions.

In an embodiment, the interactions chain data structure is realized as a graph including nodes representing respective chain links and edges representing connections between chain links. Moreover, such a graph may be realized as a directed graph where the edges in the graph have respective orientations corresponding to dependencies between the chain links represented by the nodes connected via the edges. Non-limiting examples of such graphs are discussed above with respect to FIGS. 3A-C.

At S550, link status values representing respective statuses of chain links of the interactions chain data structure are initialized. In an example implementation, each link status value may be initialized to indicate that the link is intact (i.e., that components of the link are functioning or otherwise have not failed). As a non-limiting example where binary status values are used with 0 representing an intact link and 1 representing a broken link, each of the link status values may be initialized to 0. As discussed herein, using binary values may improve efficiency and speed of analysis to determine available safety maneuvers.

As discussed herein, the link status values may be utilized to track statuses of links. More specifically, communications such as signals for respective components may be monitored over time and, when a signal indicating that a component has failed is received or when no signal has been received for the component within a threshold period of time, the link status value of the chain link corresponding to that component may be updated to indicate that the link is broken. After such an update, incoming signals may continue to be monitored until a signal for the component is received or a signal indicating that the component is functioning is received, at which time the link status value for the chain link representing the previously failed component may be updated to indicate that the chain link is intact again.

When a safety maneuver is required (e.g., when a safety maneuver trigger has been detected), the link status values in the interactions chain data structure may be checked in order to determine statuses of each chain link. Based on these determined statuses, available safety maneuvers may be determined. By maintaining such link status values over time as signals are received (or not received), the checking of chain link statuses may be further accelerated. That is, when a safety maneuver is to be performed, previously determined link status values stored in the interactions chain data structure may be checked rather than analyzing a current status of each chain link at the time when the safety maneuver is to be performed, thereby allowing for determining chain link statuses faster in response to a safety maneuver trigger.

Figure 6:
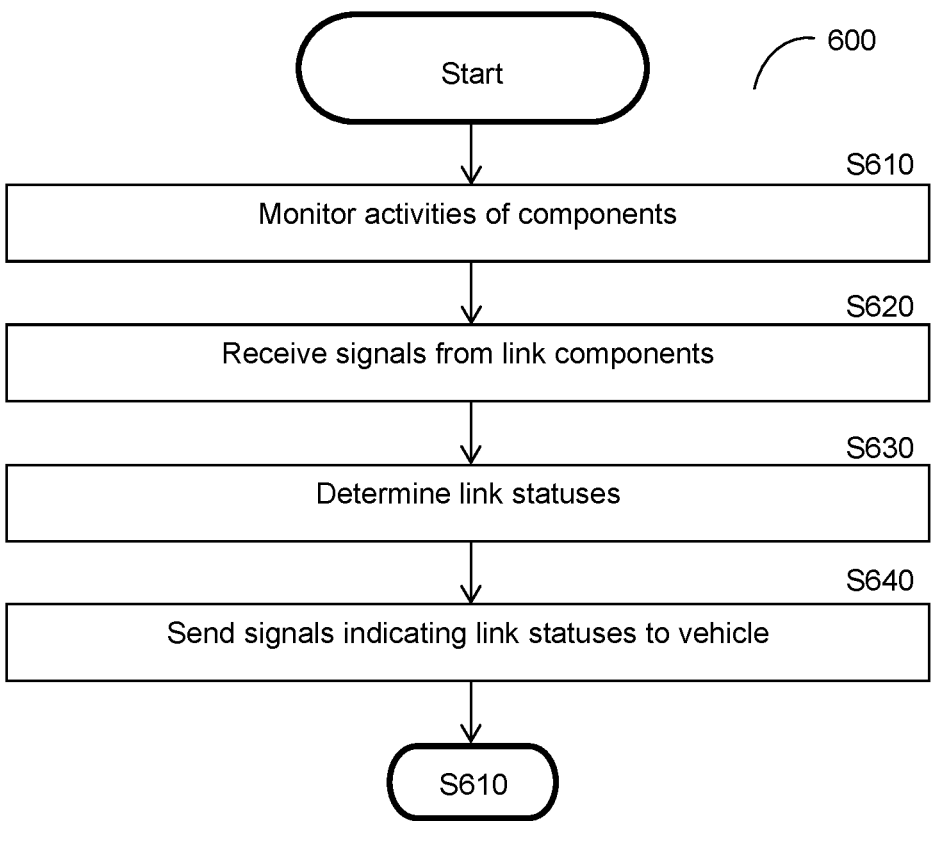
FIG. 6 is a flowchart illustrating a method for signaling link statuses to a vehicle according to an embodiment.

FIG. 6 is a flowchart 600 illustrating a method for signaling link statuses to a vehicle according to an embodiment. In an embodiment, the method is performed by the remote operation system 140, FIGS. 1A-B.

At S610, activities of components of the vehicle are monitored. The monitoring may include, but is not limited to, analyzing data of one or more control systems of the vehicle which are communicatively connected to the control system. Such monitoring may allow for identifying components of the vehicle to be included in or otherwise represented by chain links of an interaction chain.

At S620, signals are received for one or more components represented by chain links of an interactions chain for the vehicle (e.g., signals received from the components, from systems monitoring the components, or both). The interactions chain for the vehicle includes a set of interactions between components used for operation of the vehicle, and may include a set of interactions between components beginning with components of the vehicle or deployed locally with respect to the vehicle (e.g., components which communicate with systems of the vehicle directly over local networks or without networks) and ending with components deployed remotely from the vehicle (e.g., components which communicate with the vehicle indirectly over one or more networks and which may be deployed in a remote geographic location from the vehicle such as a location that is outside of a predetermined distance from the vehicle).

At S630, link statuses of chain links among the interactions chain for the vehicle are determined. In an embodiment, determining the link statuses includes applying link status determination rules defined with respect to signals received for the components over time. In a further embodiment, the link status determination rules may define conditions for identifying a link as broken. In such an embodiment, if a link is not identified as broken, it may be determined as being intact.

In yet a further embodiment, a link is identified as broken if a most recent signal received for one or more components represented by the link indicates that one or more of the components represented by the link have failed, if a signal has not been received for the link within a threshold period of time since a most recent previously received signal for the link, or both (i.e., if either a most recent signal received for the link indicates failure of a component or if no signal is received for the link within a threshold period of time since a last signal received for the link). Such a threshold period of time may be used to define a gap threshold, where if a gap between a most recent signal received for a given component and a current time is above the threshold period of time, it may be determined that no signal has been received for the chain link recently and the chain link should be treated as broken until signals resume.

In some embodiments, the link status determination rules applied to different links may be different depending on the type of link. As a non-limiting example, a type of link representing a braking system component may be defined such that the link is determined as broken only when a signal indicating that the braking system has failed is received and not when a signal has not been received for the braking system within a threshold period of time. In this regard, it is noted that, in some implementations, a braking system may be expected not to send any signals when the vehicle is stopped (i.e., such that the braking system is not active) but that this lack of signals does not actually indicate a failure. By applying different sets of link status determination rules to different types of links, differences in behaviors of underlying components represented by the links which may affect signals for those links may be considered in order to more accurately determine link status for those links.

The threshold period of time used for each link may be a predetermined value or may be determined based on historical signals sent for the link. The predetermined value may further vary based on type of link, that is, different predetermined values may be used as the threshold period of time for different types of links. The threshold period of time determined based on historical signals may be calculated based on the amount of time between signals historically and may be determined based on an average amount of time between historical signals, a maximum amount of time among the amounts of time between historical signals, and the like. Optionally, the threshold period of time may be determined based further on a predetermined buffer time, for example, a predetermined amount of time to be added to an average or other representative amount of time in order to yield the threshold period of time.

At S640, one or more signals indicating the determined link statuses are sent. In an embodiment, the signals are sent to a system installed on or deployed with respect to the vehicle which is configured to use such signals to determine safety maneuvers as discussed herein (e.g., the maneuver manager 130 as depicted in either FIG. 1A or FIG. 1B).

In an embodiment, the signals are sent to the vehicle such that the vehicle receives the signals in one or more uniform formats which are known to the vehicle (e.g., predetermined formats recognized in software instructions which are used by the vehicle). To this end, in a further embodiment, the signals are sent using one or more rules, protocols, or combinations thereof. For example, such a set of rules, protocols, or both, may be realized via one or more application programming interfaces (APIs) which define the rules, protocols, or both. Such an API may be utilized to effectively translate signals sent from the components into formats which are recognized by software utilized by the vehicle, thereby ensuring that the vehicle can accurately determine statuses based on the signals. The formats may be one or more uniform signal formats recognized by software utilized by the vehicle. That is, each API may be utilized to determine a signal in a second format based on a signal in a first format, where the first format is a format utilized by the component or system sending the signal and the second format is a format utilized by the vehicle.

It should be noted that the process discussed with respect to FIG. 6 may be utilized in accordance with some embodiments in order to facilitate collection and transmission of signals to the vehicle or to a system otherwise configured to determine safety maneuvers for the vehicle, but that the disclosed embodiments are not necessarily limited as such. In some embodiments, signals may be sent to the vehicle or to the system configured to determine safety maneuvers for the vehicle directly from the components (i.e., without being collected at a central system).

Further, in some embodiments, only some of the link statuses may be determined as described with respect to FIG. 6. In particular, when the method of FIG. 6 is performed by a system deployed remotely from the vehicle (e.g., the remote operation system 140, FIGS. 1A-B), some embodiments may include such a remote system determining chain link statuses only for chain links representing components deployed remotely from the vehicle and not for chain links representing components deployed locally from the vehicle. As a non-limiting example for the interactions chain depicted in FIG. 2A, link statuses for chain links among the set of remote operation-side links 202 may be determined and sent as described with respect to FIG. 6 (and not necessarily link statuses for chain links among the set of vehicle-side links 201 or the network link 250). In this regard, the method of FIG. 6 may be utilized to facilitate sending signals in one packet or set of packets in order to further improve efficiency of transmitting data to be used for determining safety maneuvers between the vehicle and remote systems.

Figure 7:
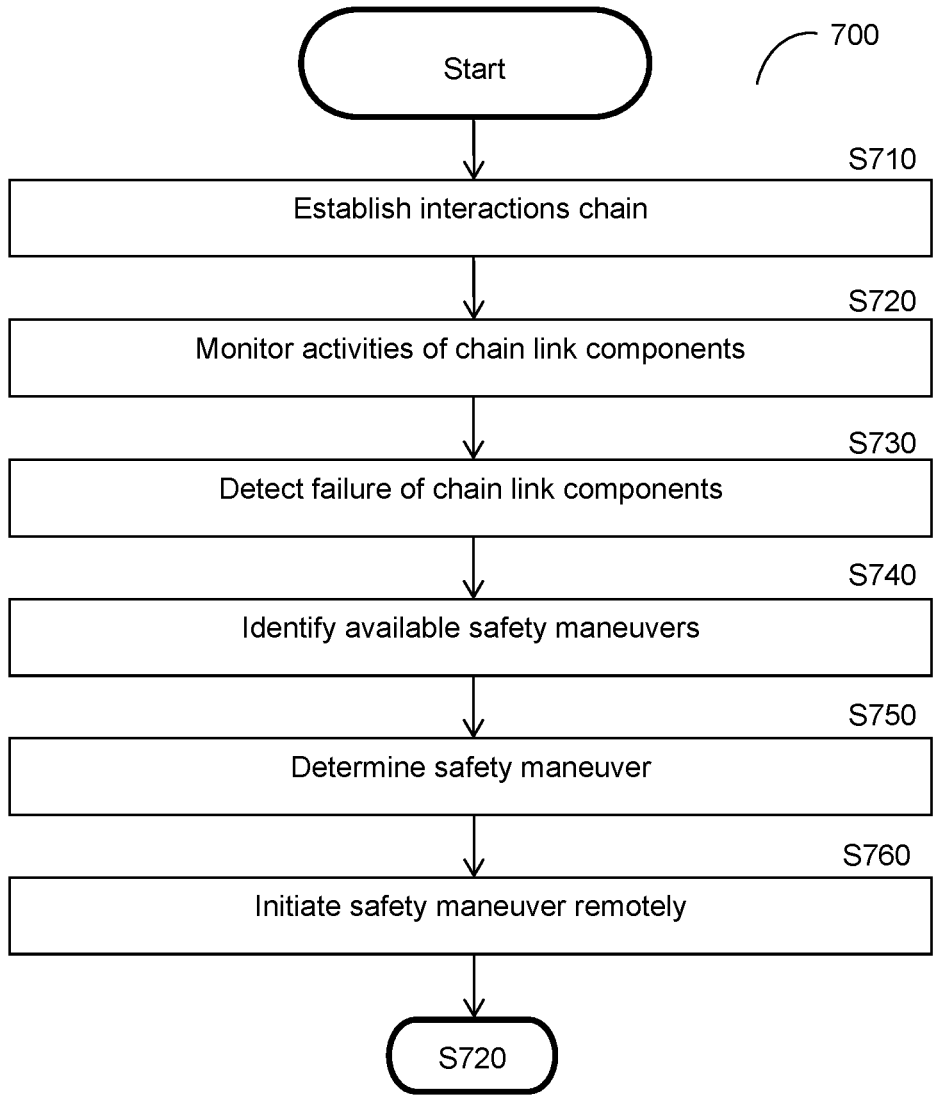
FIG. 7 is a flowchart illustrating a method for initiating safety maneuvers remotely using an interactions chain according to an embodiment.

FIG. 7 is a flowchart 700 illustrating a method for initiating safety maneuvers remotely using an interactions chain according to an embodiment. In an embodiment, the method is performed by the maneuver manager 130, FIG. 1B. In another embodiment, the method is performed by the remote operation system 140, FIGS. 1A-B.

At S710, an interactions chain is established. In an embodiment, establishing the interactions chain includes creating an interactions chain data structure representing the interactions chain. The interactions chain represents a series of interactions between components which collectively allow for operating the vehicle and, in accordance with various disclosed embodiments, may collectively allow for operating the vehicle at least partially remotely (e.g., using commands sent to the vehicle). The interactions chain may be represented as a series of links arranged in an order, for example but not limited to, one of the orders discussed above with respect to FIGS. 2A-C.

In an embodiment, the interactions chain data structure may be realized as a graph including nodes and edges, where at least some of the nodes represent respective links in the chain of interactions. Edges between nodes representing links may represent failure-related connections between those links. In other words, in at least some circumstances, when a component represented by a node on one side of an edge has failed, a component represented by a node on the other side of the edge may also be treated as failed (e.g., for purposes of identifying available safety maneuvers and for determining safety maneuvers to perform). Rules defining such circumstances may be utilized to identify available safety maneuvers and to determine safety maneuvers as discussed herein.

An example process which may be utilized to create an interactions chain data structure is described further above with respect to FIG. 5.

At S720, communications are received for chain links represented in the interactions chain. In some embodiments, a signal or other communication is received for one or more components represented by each chain link. In a further embodiment, such a signal or communication is received for each chain link repeatedly, for example, periodically. As a non-limiting example, a packet containing such a signal or communication may be received for each chain link at periodic intervals (e.g., every 50 milliseconds).

In some implementations, each component represented by one of the chain links may send such a signal at periodic intervals. When a signal indicating that the component has failed is received, or when a signal is not received from that component within a predetermined period of time (e.g., a period of time determined based on the time interval at which the component sends such signals), it may be determined that the component is failed or otherwise inactive (e.g., as discussed further below with respect to S740).

As discussed herein, such signals or communications may be used to check the status of different components represented among the interactions chain over time. For example, if signals cease being received for a given link or if signals for that link indicate that one of the components represented by that link have failed, it may be determined that the link is broken and its components should be treated as failed at least until a signal indicative of the link being active (e.g., a signal indicating an active-representing value or otherwise a signal received after signals ceased being received for the link) is subsequently received. Further, as discussed herein, some or all of the components downstream of the components represented by that link may also be treated as failed in at least some situations where a link is broken.

In this regard, it is noted that safety maneuvers are often performed in time-sensitive situations, and determining whether certain components between a vehicle and a remote system have failed may take more time than is permitted given the circumstances. By actively checking to see if signals indicative of active status are received (e.g., at regular intervals), it can be promptly determined whether certain components should be assumed to have failed for purposes of making safety maneuver decisions. This, in turn, improves safety of the vehicle when operating under circumstances where at least some vehicle operations would otherwise be performed remotely. That is, the periodic intervals for checking statuses may be set in fractions of a second such that potential changes in status can be reacted to quickly, thereby ensuring maximum safety for the vehicle.

In an embodiment, the communications include binary signals for each chain link. In such an embodiment, each binary signal may indicate whether one or more components represented by that link are active or have failed. As a non-limiting example, a signal with a value of 0 may indicate that the link is active and a signal with a value of 1 may indicate that the link has failed, or vice versa (e.g., value of 0 indicates that link has failed and value of 1 indicates that link is active). Using binary signals to check statuses may further improve efficiency of the process in a manner that improves safety of the vehicle. That is, such binary values can be processed more quickly and using fewer computing resources than more complex signals. Accordingly, using binary values as simplified representations of link statuses allows for making decisions related to safety maneuvers faster which, as noted above, improves safety of the vehicle when safety maneuver decisions must be made in time-sensitive situations.

At S730, a safety maneuver trigger is detected. In an embodiment, the safety maneuver trigger is detected based on sensor signals from one or more systems installed on the vehicle or otherwise configured to monitor vehicle activities for potential dangers. In a further embodiment, detecting the safety maneuver trigger includes applying one or more safety maneuver trigger detection rules defined with respect to sensor signals of sensors installed on or otherwise deployed with respect to the vehicle.

As a non-limiting example, safety systems installed on the vehicle may be configured to monitor sensor signals from vehicle parts in order to determine if any of those vehicle parts have failed, to monitor sensor signals from cameras installed on the vehicle to identify unsafe driving conditions, and the like. Such events may be utilized to detect a trigger for a situation where a safety maneuver such as a minimal risk maneuver (MRM) should be performed in order to keep the vehicle, its occupants, nearby bystanders, and the like, safe. More specifically, in some implementations, when a safety system installed on the vehicle detects such a failure or unsafe driving conditions, the safety system may send data indicating the failure or unsafe driving conditions to a system performing the process of FIG. 7 (e.g., the maneuver manager 130 or the remote operation system 140), and the system detects the safety maneuver trigger using such data from the vehicle.

Alternatively or in combination with safety maneuver triggers defined with respect to sensor signals of sensors deployed with the vehicle, the safety maneuver triggers may include interactions chain safety maneuver triggers defined with respect to the interactions chain. Such interactions chain safety maneuver triggers may define one or more safety maneuver triggers based on, for example, broken links. That is, when one or more links in the chain switch from an active status to a failed status, such a switch may be detected as a trigger to perform a safety maneuver. Moreover, in some embodiments, only certain links or certain types of links becoming broken (i.e., switching from active status to failed status) may be detected as a safety maneuver trigger.

To this end, in a further embodiment, detecting the safety maneuver trigger may include checking statuses of chain links in the chain of interactions in order to determine whether any chain links are broken. Checking statuses of chain links is described further below with respect to S740. Accordingly, in such an embodiment, the chain link statuses may be checked prior to or at S730, either in addition to checking the chain link statuses at S740 or instead of checking the chain link statuses at S740.

In another embodiment, the safety maneuver trigger may be detected based on network conditions for the vehicle. That is, in such an embodiment, one or more triggers for performing a safety maneuver may be defined with respect to network conditions of a vehicle and, in particular, of a vehicle for which at least some operations are being performed, controlled, or otherwise initiated remotely. Such network conditions may be or may include network conditions currently being experienced by the vehicle, or expected future network conditions determined based on a navigation route for the vehicle.

To this end, the safety maneuver trigger detection rules may include at least some rules defining network conditions which are either considered safe (i.e., such that they do not trigger a safety maneuver) or unsafe (i.e., such that they do trigger a safety maneuver). In a further embodiment, the network condition-based safety maneuver trigger detection rules may be defined with respect to network metrics such as, but not limited to, latency, jitter, packet loss, throughput, speed, bandwidth, network availability, packet duplication, error rate round-trip time, combinations thereof, and the like. As a non-limiting example, the safety maneuver trigger detection rules may define a predetermined threshold for packet loss such that, when packet loss for the vehicle exceeds the threshold, a safety maneuver trigger is detected.

In this regard, it is noted that effective remote operation of a vehicle over one or more networks relies upon network conditions. That is, if network conditions are poor, commands to perform safety maneuvers may not be received timely, or circumstances requiring a safety maneuver may not be detected at all. For example, when there is significant lag, video data may take longer to receive on the remote operation system's end and, consequently, the remote operation system may not be able to detect other safety maneuver trigger events. By using at least some safety maneuver triggers defined with respect to network conditions, safety of the vehicle may be improved as compared to solutions which do not account for network conditions. That is, triggering safety maneuvers when network conditions are poor may avoid situations where other safety maneuver triggers are not detected or where a safety maneuver trigger is detected but network conditions have degraded such that the vehicle does not receive the command to perform the safety maneuver in time to avoid an accident.

It is also noted that some contexts may require certain components to remain active at all times in order for the vehicle to operate safely such that failure of one of these components may require performing a safety maneuver in order to ensure safe operation of the vehicle. As a non-limiting example, a vehicle which is remotely operated based on video feed from the vehicle may not be possible to operate safely when the camera fails or the video feed is otherwise not being received remotely. Thus, failure of a camera or of a network interface used by the vehicle to capture or transmit the video feed may result in detecting a trigger for performing a safety maneuver which does not utilize the video feed.

At S740, chain link statuses are determined for chain links among the interactions chain. In an embodiment, the chain link statuses are determined based on the received communications. In a further embodiment, each chain link status is determined as either intact (e.g., when the components represented by the chain link are active or otherwise have not failed) or broken (e.g., when one or more of the components represented by the chain link have failed). In other words, a chain link may be considered intact when the components represented by the chain link are functioning, and a chain link may be considered broken when one or more of the components represented by the chain link are not functioning (or it otherwise cannot be determined whether any or all of the components have failed).

In an embodiment, each chain link status is determined based on signals received from or with respect to one or more components represented by each chain link over time. More specifically, such signals may indicate whether the component has failed such that, if a signal indicating such failure is received for a given component, the chain link representing that component may be considered failed for at least some identifications of available safety maneuvers. As discussed herein, such signals may be realized via a binary value which can be transmitted and analyzed efficiently and quickly, thereby allowing for efficiently determining chain link statuses for use in identifying available safety maneuvers.

In a further embodiment, such signals may be received periodically at regular intervals. In such an embodiment, if no signal is received for a given component within a predetermined period of time or otherwise within a period of time corresponding to the time intervals at which the signals are received for the component (e.g., as determined based on an average time between signals for that component), it may be determined that the component has failed and, consequently, that the chain link representing that component is broken. Accordingly, when no signal is received for a component within such period of time, the status of the chain link representing the component may be determined as broken.

At optional S750, available safety maneuvers are identified for the vehicle based on the determined chain link statuses. In an embodiment, the available safety maneuvers include safety maneuvers supported by a current state of interactions between the vehicle and one or more remote systems as determined based on the chain link statuses. Maneuvers which are supported by a current state of interactions may include maneuvers which would utilize components which are active or otherwise not failed, for example as indicated by the corresponding chain links representing those components having statuses of intact. More specifically, in a further embodiment, available safety maneuvers are safety maneuvers which only use components which are represented by intact chain links. In other words, in such an embodiment, maneuvers which use any components which have failed or are otherwise represented by broken chain links are determined to be unavailable and are not determined as available safety maneuvers.

As noted above, in at least some situations where safety maneuvers must be performed, performance of the safety maneuvers may be time-critical. In such situations, there may not be sufficient time to perform a detailed investigation into exact components, features, subsystems, programs, or other subcomponents which may have failed in order to determine what safety maneuvers can be performed. On the other hand, naively assuming that all safety maneuvers are available may sometimes result in attempting to perform a safety maneuver which cannot be performed safely due to failure of one or more components used for interactions between the vehicle and remote systems. By using a chain of interactions as discussed herein to track interactions between components in the chain of interactions which might be affected by failure of other components, the disclosed embodiments effectively allow for automatically making assumptions about available safety maneuvers which allow for identifying the potential safety maneuvers more quickly even as compared to other automated solutions while avoiding falsely identifying available safety maneuvers which are not actually available.

In a further embodiment, the available safety maneuvers are determined based further on a type of the vehicle. More specifically, different predetermined types of vehicles may have corresponding safety maneuvers which the vehicle is configured to perform by default. Such types of vehicles may be defined with respect to make, model, software programs installed, versions of such software programs, whether the vehicle came installed with or had installed additional components, combinations thereof, and the like. To this end, in such an embodiment, identifying the available safety maneuvers includes checking a data set indicating predetermined types of vehicles with corresponding sets of predetermined safety maneuvers based on a type of the vehicle for which a safety maneuver is to be performed in order to determine potential safety maneuvers that the vehicle would normally be capable of performing.

Based on the set of potential safety maneuvers that the vehicle would normally be capable of performing, a set of available safety maneuvers excluding safety maneuvers which are not viable due to broken chain links may be determined and identified as the available safety maneuvers. The type of the vehicle may be determined, for example, based on data from the vehicle indicating information about the type of vehicle, from one or more databases storing data about the vehicle (e.g., a database provided by a manufacturer of the vehicle), both, and the like.

At optional S760, one or more safety maneuvers are determined. In an embodiment, determining the safety maneuvers includes applying one or more safety maneuver determination rules. Such safety maneuver determination rules may be defined based on factors such as, but not limited to, a type of safety maneuver trigger (e.g., as detected at S730), current operational parameters for the vehicle (e.g., speed, direction, etc.), maps or other navigation-related data about an area surrounding a current location of the vehicle, combinations thereof, and the like. In a further embodiment, the determined safety maneuver is selected from among the available safety maneuvers identified at S750. To this end, in such an embodiment, the safety maneuver determination rules further define that the safety maneuver to be determined is to be selected from among such available safety maneuvers for the vehicle.

It should be noted that steps S750 and S760 are discussed with respect to being optionally performed by a remote system (i.e., a system that is remote from the vehicle) but that, in at least some embodiments, these optional steps are performed by a system installed on the vehicle. In other words, these steps may be optionally excluded from the process of FIG. 7 when the process is performed by a system remote from the vehicle, but may be performed by a system installed on the vehicle rather than not being performed at all.

At S770, one or more safety maneuvers are initiated. More specifically, initiating the safety maneuvers may include sending one or more commands, instructions, or other communications prompting the vehicle to perform one or more safety maneuvers. Such commands, instructions, or other communications may be or may include one or more signals.

When safety maneuvers for the vehicle are determined at S760, the initiated safety maneuvers may be or may include those determined safety maneuvers. Alternatively, initiating the safety maneuver may include sending the vehicle commands, instructions, or other communications prompting the vehicle to utilize one of its available safety maneuvers in order to perform that safety maneuver. In other words, in such an embodiment, the system performing the method of FIG. 7 sends a command to the vehicle to initiate a safety maneuver which may not indicate which safety maneuver the vehicle should perform. In such an embodiment, the vehicle may make decisions regarding which safety maneuver to perform.

In this regard, it is noted that vehicles are often configured with safety maneuvers which have been tested and certified as being safe under many different circumstances. Accordingly, leveraging such tested safety maneuvers of a vehicle allow for further improving safety, particularly when a safety maneuver is initiated by a remote system. Moreover, if a vehicle is incapable of performing a given safety maneuver, the vehicle may be capable of more quickly and more accurately determining its available safety maneuvers such that commanding the vehicle to initiate a safety maneuver (but not a specific safety maneuver) may therefore improve security of performing the safety maneuver. In other words, avoiding instructing the vehicle to perform specific safety maneuvers allows the vehicle to perform safety maneuvers independently and safely, and may help to ensure that the safety maneuvers performed by the vehicle are only safety maneuvers which have been approved for safe use by the vehicle.

In some embodiments, S770 may include sending a signal indicating either that all chain links among the chain of interactions are interact, or that one or more of the chain links are broken. That is, the safety maneuver may be initiated by sending a signal indicating whether the chain of interactions is fully intact (i.e., all chain links among the chain are intact) or whether the chain of interactions has broken (i.e., by having one or more broken chain links). More specifically, when such a signal indicates that the chain of interactions is broken (e.g., by indicating that one or more chain links is broken), such a broken-indicating signal may prompt the vehicle to initiate a safety maneuver.

Moreover, such a signal may, in at least some embodiments, be realized as a binary signal in order to minimize the amount of data needed to be transmitted to the vehicle, thereby conserving computing resources and reducing the likelihood that the signals will be lost in transit. That is, the signal may include only a binary value representing either that all chain links are intact, or that one or more chain links are broken. As a non-limiting example, a binary value of 0 may indicate that all chain links are intact, and a binary value of 1 may indicate that one or more chain links are broken. Additionally, such a binary value may be analyzed quickly and efficiently, thereby increasing the speed at which the safety maneuver may be initiated by the vehicle in response to receiving a signal indicating that one or more chain links are broken.

In an embodiment, once the safety maneuvers have been initiated, execution may continue with S720 where additional communications are received and monitored for subsequent safety maneuver triggers.

Figure 8:
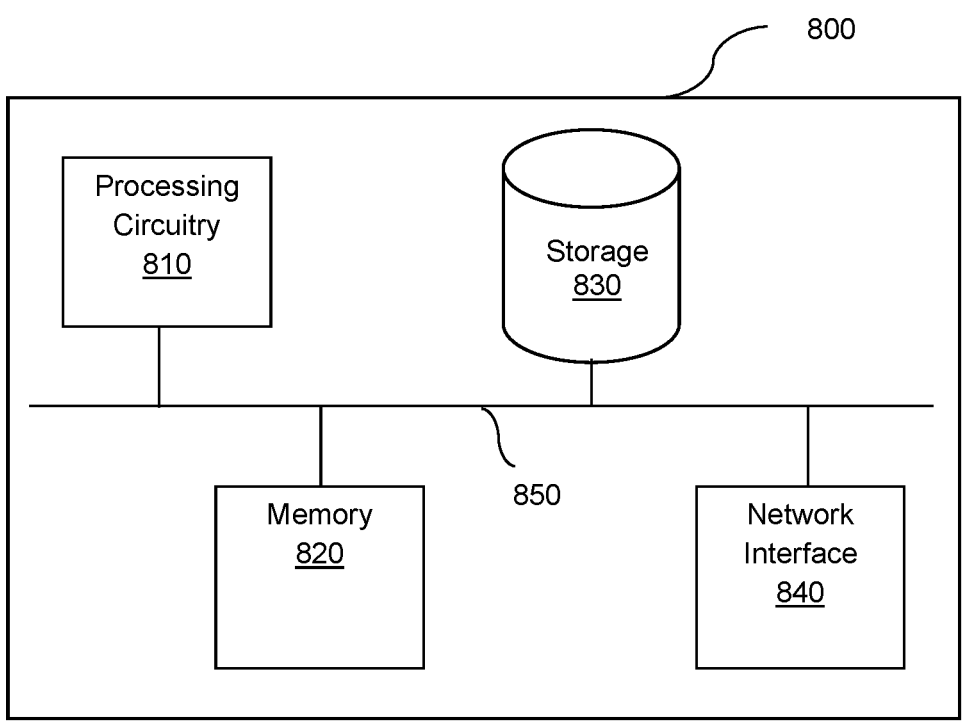
FIG. 8 is a schematic diagram of a hardware layer which may be utilized to realize various disclosed embodiments.

FIG. 8 is an example schematic diagram of a hardware layer 800 which may be utilized to realize various disclosed embodiments. The hardware layer 800 includes a processing circuitry 810 coupled to a memory 820, a storage 830, and a network interface 840. In an embodiment, the components of the hardware layer 800 may be communicatively connected via a bus 850.

The processing circuitry 810 may be realized as one or more hardware logic components and circuits. For example, and without limitation, illustrative types of hardware logic components that can be used include field programmable gate arrays (FPGAs), application-specific integrated circuits (ASICs), Application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 820 may be volatile (e.g., random access memory, etc.), non-volatile (e.g., read only memory, flash memory, etc.), or a combination thereof.

In one configuration, software for implementing one or more embodiments disclosed herein may be stored in the storage 830. In another configuration, the memory 820 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 810, cause the processing circuitry 810 to perform the various processes described herein.

The storage 830 may be magnetic storage, optical storage, and the like, and may be realized, for example, as flash memory or other memory technology, compact disk-read only memory (CD-ROM), Digital Versatile Disks (DVDs), or any other medium which can be used to store the desired information.

The network interface 840 allows the hardware layer 800 to communicate with other systems, devices, components, applications, or other hardware or software components, for example as described herein.

It should be understood that the embodiments described herein are not limited to the specific architecture illustrated in FIG. 8, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer readable medium is any computer readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A method for initiating safety maneuvers, comprising:
identifying a plurality of components used for communications between a vehicle and at least one operation system based on a plurality of signals for the vehicle;
determining a plurality of dependencies between components among the plurality of components based on a plurality of communications between the components among the plurality of components;
creating an interactions chain data structure for an interactions chain, wherein the interactions chain includes a plurality of chain links arranged in an order, the plurality of chain links representing the plurality of components, wherein the interactions chain data structure is a graph including a plurality of nodes representing the plurality of chain links and a plurality of edges connecting between nodes of the plurality of nodes, wherein the plurality of nodes is based on the identified plurality of components, wherein the plurality of edges is based on the determined plurality of dependencies;
determining a plurality of statuses of the plurality of chain links based on the plurality of signals, the plurality of nodes, and the plurality of edges; and
initiating a safety maneuver for the vehicle based on the determined plurality of statuses.

2. The method of claim 1, wherein the plurality of statuses includes a first status for a first chain link of the plurality of chain links, wherein the first status indicates that the first chain link is broken, wherein the first status is determined based on a gap between a most recent signal of the plurality of signals for the first chain link and a current time that is above a threshold.

3. The method of claim 1, wherein each of the plurality of signals is a binary value.

4. The method of claim 1, wherein the interactions chain data structure is further based on an order of the plurality of chain links, wherein the plurality of chain links includes a first chain link and a second chain link, wherein the second chain link is downstream from the first chain link within the order of the plurality of chain links, wherein a second status of the second chain link among the plurality of statuses is determined based on a first status of the first chain link among the plurality of statuses.

5. The method of claim 4, wherein the first status of the first chain link is broken, wherein the second status of the second chain link is determined as broken when it is determined that the first status of the first chain link is broken.

6. The method of claim 1, wherein at least one first of the plurality of statuses is determined based on a second status of the plurality of statuses.

7. The method of claim 1, wherein the interactions chain is determined based on a type of the vehicle and at least one predetermined component associated with the type of the vehicle.

8. The method of claim 1, wherein the interactions chain is determined based on at least one predetermined second type of component associated with at least one predetermined first type of component represented by a portion of the plurality of chain links.

9. The method of claim 1, further comprising:
identifying at least one available safety maneuver for the vehicle based on the determined plurality of statuses;
determining a safety maneuver based on the identified at least one available safety maneuver, wherein the initiated safety maneuver is the determined safety maneuver.

10. A non-transitory computer readable medium having stored thereon instructions for causing a processing circuitry to execute a process, the process comprising:
identifying a plurality of components used for communications between a vehicle and at least one operation system based on a plurality of signals for the vehicle;
determining a plurality of dependencies between components among the plurality of components based on a plurality of communications between the components among the plurality of components;
creating an interactions chain data structure for an interactions chain, wherein the interactions chain includes a plurality of chain links arranged in an order, the plurality of chain links representing the plurality of components, wherein the interactions chain data structure is a graph including a plurality of nodes representing the plurality of chain links and a plurality of edges connecting between nodes of the plurality of nodes, wherein the plurality of nodes is based on the identified plurality of components, wherein the plurality of edges is based on the determined plurality of dependencies;
determining a plurality of statuses of the plurality of chain links based on the plurality of signals, the plurality of nodes, and the plurality of edges; and
initiating a safety maneuver for the vehicle based on the determined plurality of statuses.

11. A system for initiating safety maneuvers, comprising:
a processing circuitry; and a memory, the memory containing instructions that, when executed by the processing circuitry, configure the system to:

identify a plurality of components used for communications between a vehicle and at least one operation system based on a plurality of signals for the vehicle;

determine a plurality of dependencies between components among the plurality of components based on a plurality of communications between the components among the plurality of components;

create an interactions chain data structure for an interactions chain, wherein the interactions chain includes a plurality of chain links arranged in an order, the plurality of chain links representing the plurality of components, wherein the interactions chain data structure is a graph including a plurality of nodes representing the plurality of chain links and a plurality of edges connecting between nodes of the plurality of nodes, wherein the plurality of nodes is based on the identified plurality of components, wherein the plurality of edges is based on the determined plurality of dependencies;

determining a plurality of statuses of the plurality of chain links based on the plurality of signals, the plurality of nodes, and the plurality of edges; and initiate a safety maneuver for the vehicle based on the determined plurality of statuses.

12. The system of claim 11, wherein the plurality of statuses includes a first status for a first chain link of the plurality of chain links, wherein the first status indicates that the first chain link is broken, wherein the first status is determined based on a gap between a most recent signal of the plurality of signals for the first chain link and a current time that is above a threshold.

13. The system of claim 11, wherein each of the plurality of signals is a binary value.

14. The system of claim 11, wherein the interactions chain data structure is further based on an order of the plurality of chain links, wherein the plurality of chain links includes a first chain link and a second chain link, wherein the second chain link is downstream from the first chain link within the order of the plurality of chain links, wherein a second status of the second chain link among the plurality of statuses is determined based on a first status of the first chain link among the plurality of statuses.

15. The system of claim 14, wherein the first status of the first chain link is broken, wherein the second status of the second chain link is determined as broken when it is determined that the first status of the first chain link is broken.

16. The system of claim 11, wherein at least one first of the plurality of statuses is determined based on a second status of the plurality of statuses.

17. The system of claim 11, wherein the interactions chain is determined based on a type of the vehicle and at least one predetermined component associated with the type of the vehicle.

18. The system of claim 1, wherein the interactions chain is determined based on at least one predetermined second type of component associated with at least one predetermined first type of component represented by a portion of the plurality of chain links.

19. The system of claim 11, wherein the system is further configured to:

identify at least one available safety maneuver for the vehicle based on the determined plurality of statuses; and determine a safety maneuver based on the identified at least one available safety maneuver, wherein the initiated safety maneuver is the determined safety maneuver.

* * * * *